(12) United States Patent
Roberson et al.

(10) Patent No.: US 12,018,521 B2
(45) Date of Patent: Jun. 25, 2024

(54) MULTI-GATE AND MULTI-POSITIONAL TAILGATE FOR UTILITY TASK VEHICLE

(71) Applicant: Omega Solutions, Inc., Russellville, AR (US)

(72) Inventors: Russell K. Roberson, Atkins, AR (US); Jeremy T. Brogdon, Greenbrier, AR (US); Stanford S. Austin, Atkins, AR (US)

(73) Assignee: Omega Solutions, Inc., Russellville, AR (US)

( * ) Notice: Subject to any disclaimer, the term of this patent is extended or adjusted under 35 U.S.C. 154(b) by 671 days.

(21) Appl. No.: 17/090,785

(22) Filed: Nov. 5, 2020

(65) Prior Publication Data
US 2022/0136297 A1 May 5, 2022

(51) Int. Cl.
*B62D 33/027* (2006.01)
*B60N 3/00* (2006.01)
*B62D 33/037* (2006.01)
*E05D 11/10* (2006.01)

(52) U.S. Cl.
CPC ............ *E05D 11/1085* (2013.01); *B60N 3/00* (2013.01); *B62D 33/0273* (2013.01); *B62D 33/037* (2013.01); *E05Y 2900/544* (2013.01); *E05Y 2900/546* (2013.01)

(58) Field of Classification Search
CPC ........ E05Y 2900/544; E05Y 2900/546; B62D 33/0273; B62D 33/03; B62D 33/037; E05D 11/1085; B60N 3/00
See application file for complete search history.

(56) References Cited

U.S. PATENT DOCUMENTS

| | | | | |
|---|---|---|---|---|
| 4,864,673 A | * | 9/1989 | Adaway | B60P 1/435 296/61 |
| 5,156,432 A | * | 10/1992 | McCleary | B60P 1/435 296/61 |
| 5,215,346 A | * | 6/1993 | Reitzloff | B62D 33/0273 296/65.09 |
| 5,320,397 A | * | 6/1994 | Peterson | B62D 33/0273 296/180.1 |
| 5,575,521 A | * | 11/1996 | Speis | B62D 33/0273 296/26.11 |
| 5,597,195 A | * | 1/1997 | Meek | B60P 1/435 296/61 |
| 5,775,759 A | * | 7/1998 | Cummins | B62D 33/0273 296/26.11 |
| 5,788,311 A | * | 8/1998 | Tibbals | B62D 33/0273 296/26.11 |

(Continued)

OTHER PUBLICATIONS

Canadian Patent No. 3,100,575, Canadian Intellectual Property Office, Jun. 27, 2023.

(Continued)

*Primary Examiner* — Justin B Rephann
(74) *Attorney, Agent, or Firm* — Richard Blakely Glasgow

(57) ABSTRACT

A multi-gate and multi-positional tailgate including a main gate, an intermediate gate pivotably mounted to the main gate, and a drop gate pivotably mounted to the intermediate gate. The intermediate gate has multiple locked positions and has a 270-degree range of motion relative to the main gate. The drop gate has multiple locked positions and has a 90-degree range of motion relative to the intermediate gate.

19 Claims, 25 Drawing Sheets

(56) References Cited

U.S. PATENT DOCUMENTS

| | | | | | |
|---|---|---|---|---|---|
| 5,857,724 | A * | 1/1999 | Jarman | ............... | B62D 33/037 296/26.11 |
| 6,631,938 | B1 * | 10/2003 | Burns | ...................... | B60P 3/36 297/14 |
| 6,764,123 | B1 * | 7/2004 | Bilyard | .............. | B62D 33/0273 296/61 |
| 6,994,363 | B2 * | 2/2006 | Seksaria | ................... | B60P 3/40 280/166 |
| 7,168,722 | B1 * | 1/2007 | Piotrowski | ............... | B60R 3/02 280/166 |
| 8,109,552 | B2 * | 2/2012 | Nelson | ............... | B62D 33/0273 224/403 |
| 8,201,869 | B1 * | 6/2012 | Butlin, Jr. | ................. | B60R 3/02 296/57.1 |
| 9,452,782 | B1 * | 9/2016 | Singer | ................ | B62D 33/0273 |
| 9,463,746 | B2 * | 10/2016 | Butlin, Jr. | .............. | B62D 33/03 |
| 9,540,051 | B2 * | 1/2017 | Bauer | ................. | B60N 2/3095 |
| 9,789,913 | B2 * | 10/2017 | Singer | ................ | B62D 33/0273 |
| 9,994,263 | B1 * | 6/2018 | Richter | ................... | B60P 1/435 |
| 10,106,208 | B2 * | 10/2018 | Barrios Albert | .......... | B60R 3/02 |
| 10,300,861 | B1 * | 5/2019 | Green | ....................... | B60R 7/02 |
| 11,242,097 | B1 * | 2/2022 | Gross, IV | ............... | H04R 5/02 |
| 2004/0032142 | A1 * | 2/2004 | Sherrer | ............. | B62D 33/0273 296/61 |
| 2006/0125270 | A1 * | 6/2006 | Madlinger | ............. | B62D 33/03 296/57.1 |
| 2007/0262602 | A1 * | 11/2007 | Nagle | ...................... | B60P 3/07 296/51 |
| 2008/0106111 | A1 * | 5/2008 | Pritchard | .................. | B60R 3/02 296/62 |
| 2010/0026027 | A1 * | 2/2010 | Gao | .................... | B62D 33/0273 296/26.11 |
| 2012/0126564 | A1 * | 5/2012 | Hausler | .............. | B62D 33/0273 296/57.1 |
| 2013/0049395 | A1 * | 2/2013 | Poirier | .................... | B60R 5/041 296/37.6 |
| 2016/0075286 | A1 * | 3/2016 | Butlin, Jr. | .............. | B62D 33/03 296/50 |
| 2016/0144796 | A1 * | 5/2016 | Bexar | .................. | B62D 65/024 29/401.1 |
| 2017/0101138 | A1 * | 4/2017 | Povinelli | ........... | B62D 33/0273 |
| 2018/0229667 | A1 * | 8/2018 | Stojkovic | .................. | B60P 3/14 |
| 2019/0054961 | A1 * | 2/2019 | Ngo | ........................ | B60R 3/02 |
| 2020/0148283 | A1 * | 5/2020 | Robinson | ............... | B62D 33/03 |
| 2021/0107572 | A1 * | 4/2021 | Banks, Jr. | ............. | E05D 15/262 |
| 2021/0253030 | A1 * | 8/2021 | Bender | ..................... | B60R 3/02 |
| 2021/0380175 | A1 * | 12/2021 | Jarjoura | ................. | B62D 33/037 |
| 2022/0063736 | A1 * | 3/2022 | Williams | ........... | B62D 33/0273 |

OTHER PUBLICATIONS

Canadian Patent Application No. 3,100,575, Canadian Intellectual Property Office, Commissioner's Notice—Application Found Allowable, Feb. 21, 2023.

Canadian Patent Application No. 3,100,575, Canadian Intellectual Property Office, Office Action, Feb. 4, 2022.

* cited by examiner

US 12,018,521 B2

MULTI-GATE AND MULTI-POSITIONAL TAILGATE FOR UTILITY TASK VEHICLE

CROSS-REFERENCE TO RELATED APPLICATIONS

Not applicable

STATEMENT REGARDING FEDERALLY SPONSORED RESEARCH OR DEVELOPMENT

Not applicable

BACKGROUND OF THE INVENTION

A utility task vehicle (UTV) is a four-wheel drive off-road vehicle that is commonly referred to as a "side-by-side." A UTV typically includes a cab and a bed for hauling equipment and other objects. The space in the bed of a UTV is quite limited, which poses a challenge for a UTV user needing to haul large objects. It would therefore be desirable to develop a tailgate for the UTV that can be converted into different positions depending on the needs of the user, such as when a longer bed is needed because longer objects are being hauled or when a taller tailgate is needed to maintain larger objects in the bed of the UTV.

BRIEF SUMMARY OF THE INVENTION

The present invention is directed to a multi-gate and multi-positional tailgate for a UTV that includes a main gate pivotably mounted to an intermediate gate and a drop gate pivotably mounted to the intermediate gate. The intermediate gate has multiple locked positions and has a 270-degree range of motion relative to the main gate. The drop gate has multiple locked positions and has a 90-degree range of motion relative to the intermediate gate.

These and other features, objects and advantages of the present invention will become better understood from a consideration of the following detailed description of the preferred embodiments and appended claims in conjunction with the drawings as described following:

DETAILED DESCRIPTION OF THE INVENTION

With reference to FIGS. 1-51, the preferred embodiments of the present invention may be described. The present invention is directed to a multi-gate and multi-positional tailgate 10 for a UTV. As shown in FIGS. 1-6, the tailgate 10 includes a main gate 12, an intermediate gate 14, and a drop gate 16.

Figure 4A:
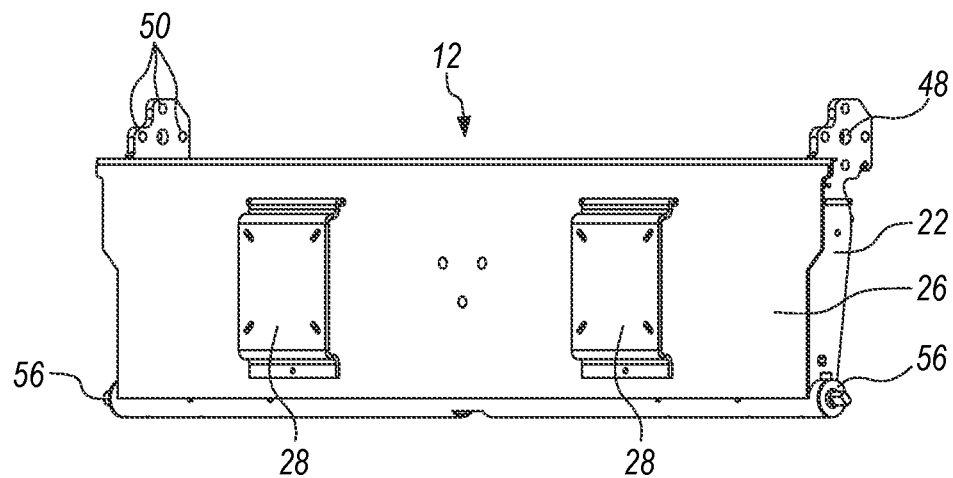
FIG. 4A is a perspective view of the inner surface of the main gate of the tailgate.
Figure 4B:
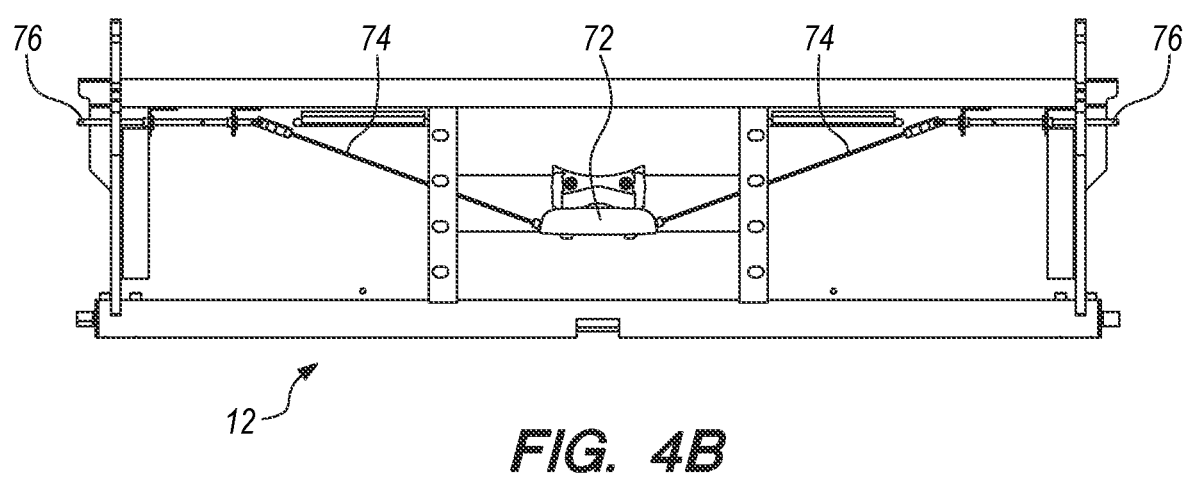
FIG. 4B is a perspective view of the outer surface of the main gate of the tailgate.
Figure 49:
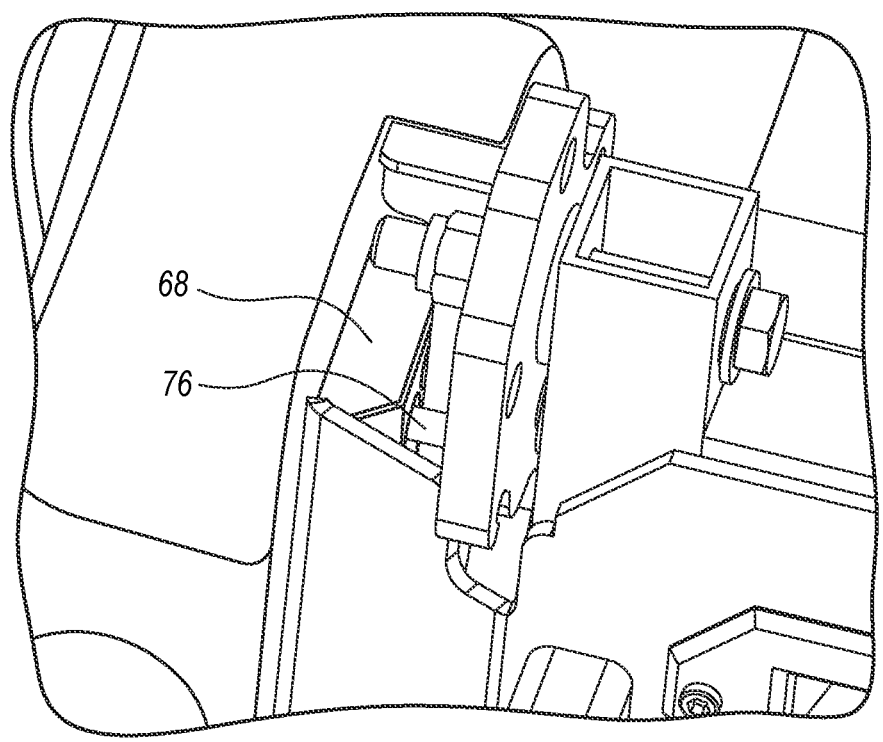
FIG. 49 is a partial perspective view of the latching system for the main gate of the tailgate.
Figure 50:
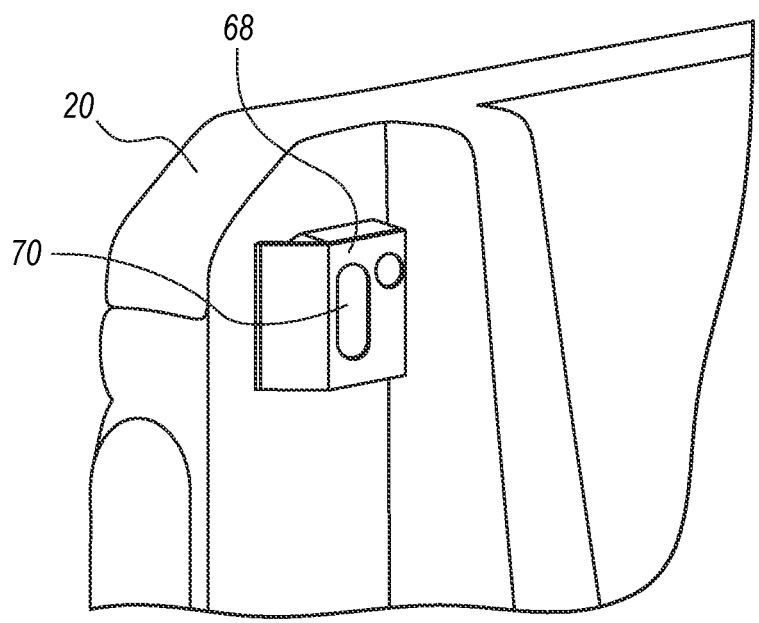
FIG. 50 is a partial perspective view of the latching system for the main gate of the tailgate.

The main gate 12 is pivotably mounted at the end of the bed 20 of the UTV. The main gate 12 is preferably mounted to the UTV using the stock hinges or pivots of the bed 20 used for the stock tailgate of the UTV. More specifically, the main gate 12 includes rods 56 in the bottom corners of the main gate 12 that are received by the pivots in the sides of the bed 20 of the UTV. The main gate 12 includes a latching system, as shown in FIGS. 4B and 49-50. The latching system includes a handle 72 for opening and closing the main gate 12. Two cables 74 connect the handle 72 and latch pins 76 that extend from the upper sides of the main gate 12. The latching system also includes latch block 68. The latch blocks 68 include slots 70 for receiving the latch pins 76. The latch block 68 is a replacement for the stock tailgate closure mount on the inside wall of the bed 20 of the UTV. The latch pins 76 have a constant spring force in the outward direction. A ramp on the leading edge of the latch block 68 forces the spring actuated pins 76 to compress as the main gate 12 is being closed. Once the latch pins 76 are received in the slots 70 of the latch block 68, the main gate 12 is in the closed position. Alternatively, the main gate 12 is secured in the closed position by any other type of tailgate latching system that would be well-known to one skilled in the art.

The main gate 12 is supported by tailgate cables 18 attached between the bed 20 of the UTV and the main gate 12. The main gate 12 has a range of motion 0-90 degrees relative to the UTV's bed 20. Lifting up on the handle 72 opens the main gate. When the handle 72 is lifted, the cables 74 pull the latch pins 76 from the slots 70 of the latch block 68, which allows the main gate 12 to be opened or lowered by the user.

Figure 7:
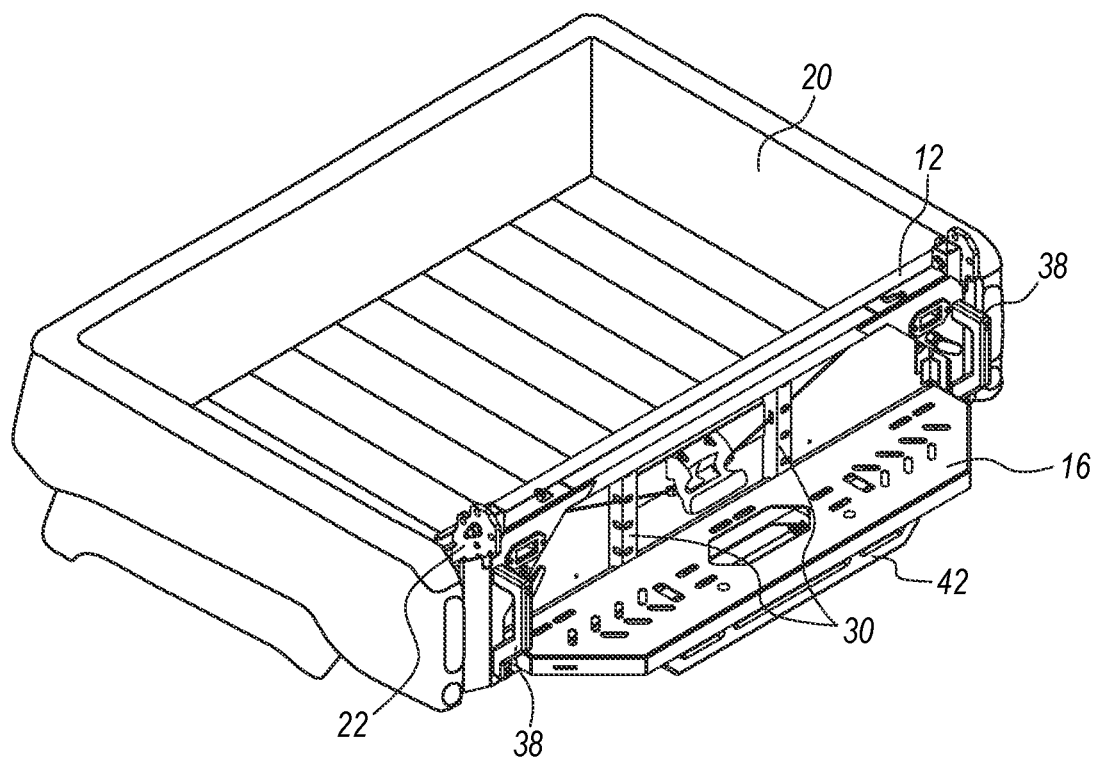
FIG. 7 is a perspective view of the tailgate in position 2.
Figure 8:
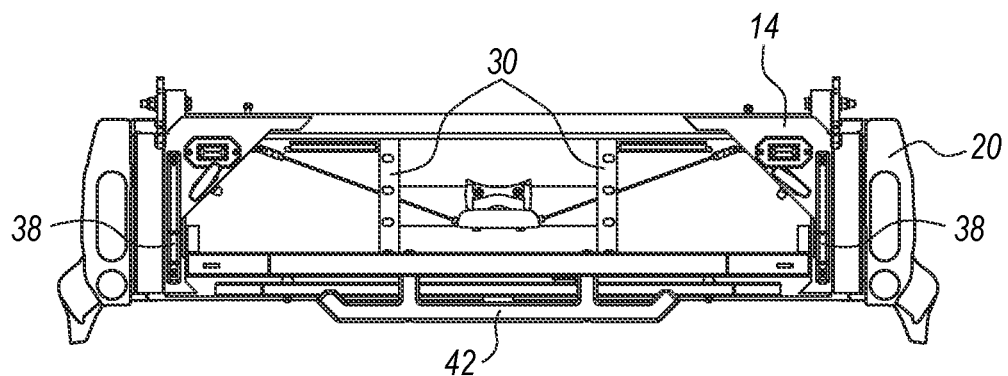
FIG. 8 is an end view of the tailgate in position 2.
Figure 9:
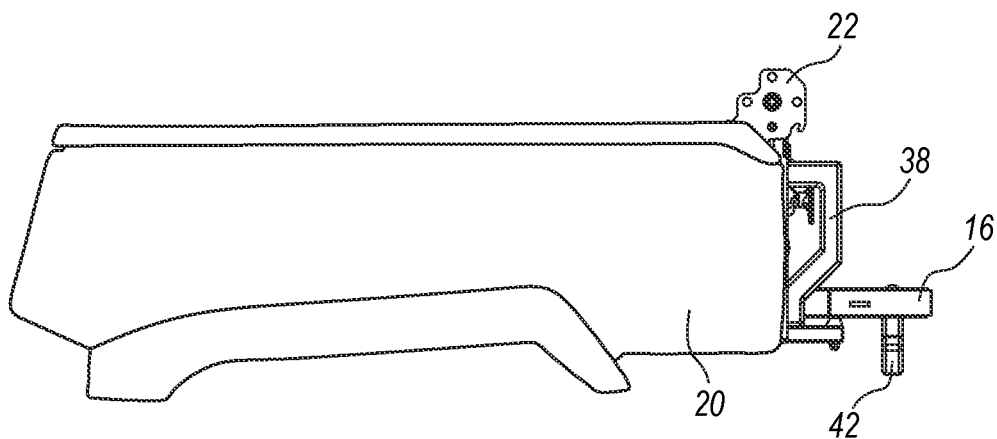
FIG. 9 is a side view of the tailgate in position 2.
Figure 31:
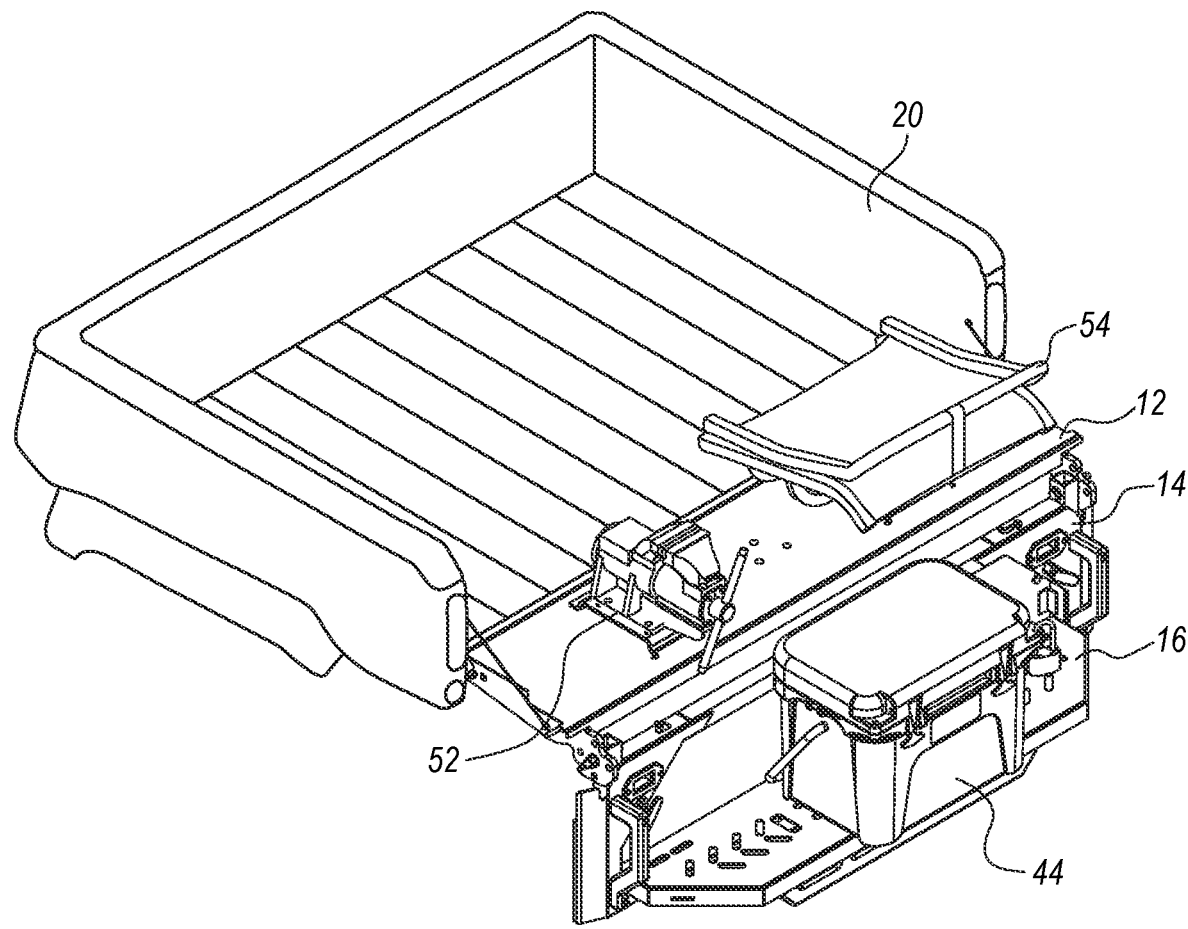
FIG. 31 is a perspective view of the tailgate in position 7 with a seat and a vice mounted to the main gate and a cooler resting on the drop gate.
Figure 32:
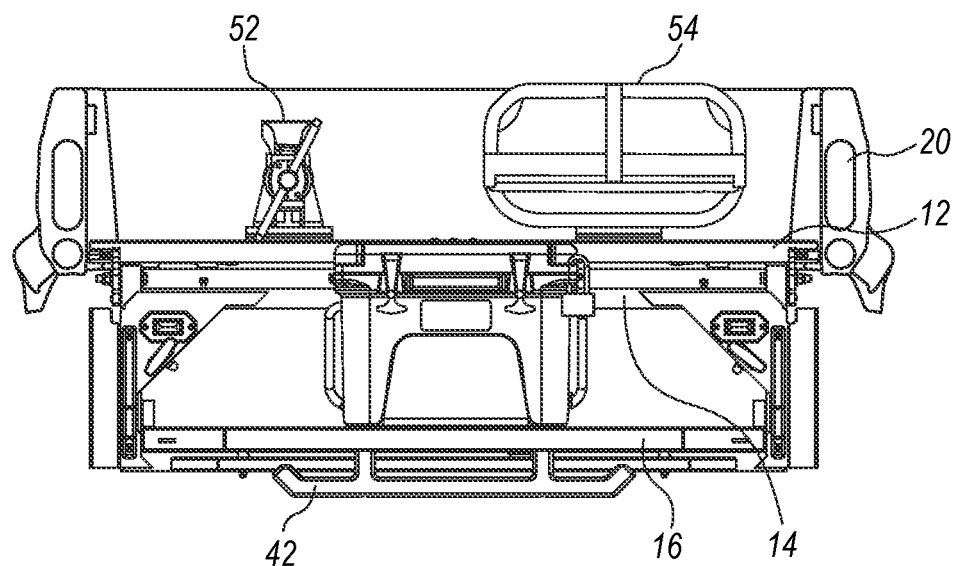
FIG. 32 is an end view of the tailgate in position 7 with a seat and a vice mounted to the main gate and a cooler resting on the drop gate.
Figure 33:
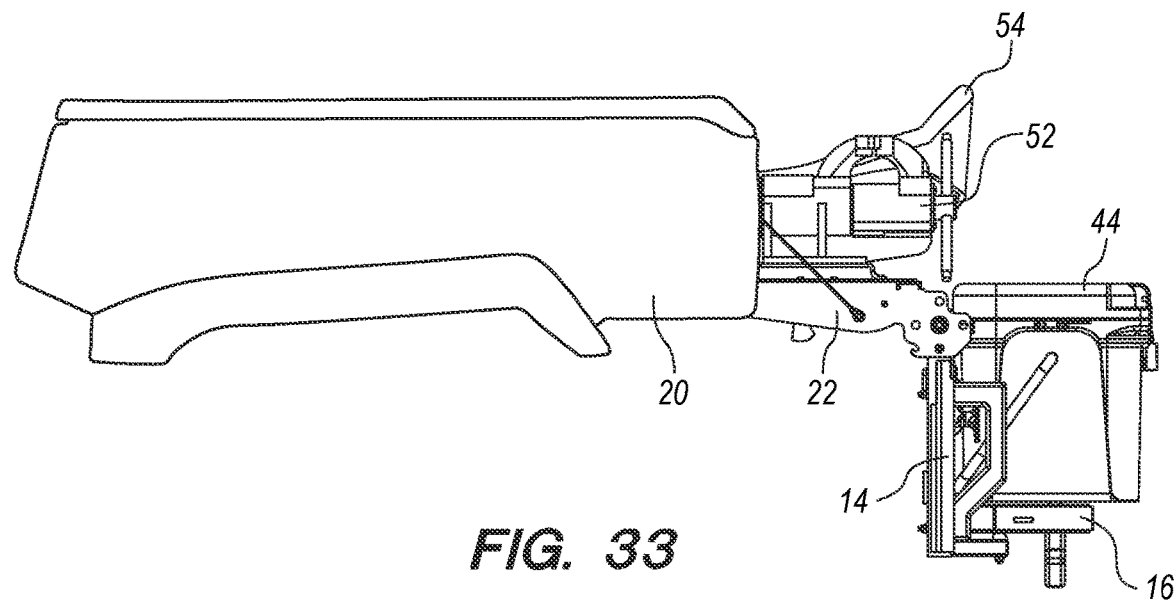
FIG. 33 is a side view of the tailgate in position 7 with a seat and a vice mounted to the main gate and a cooler resting on the drop gate.
Figure 34:
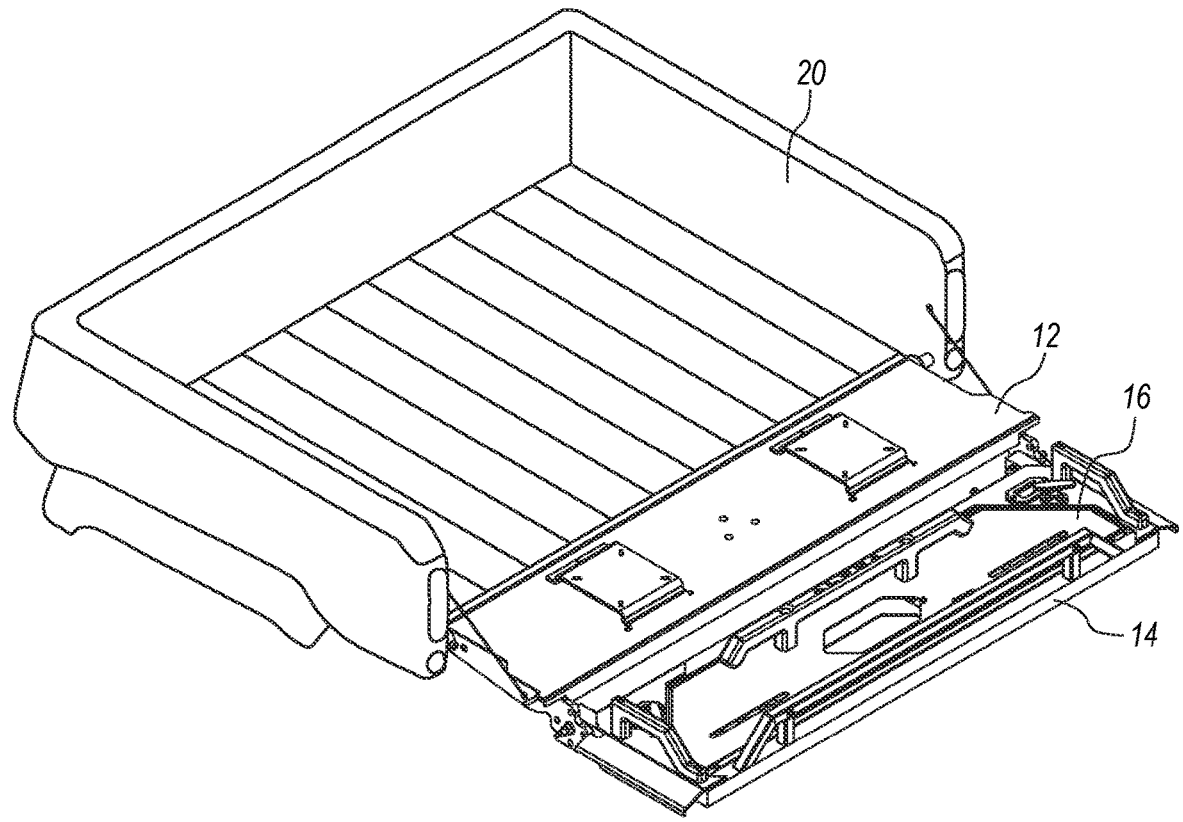
FIG. 34 is a perspective view of the tailgate in position 8.
Figure 35:
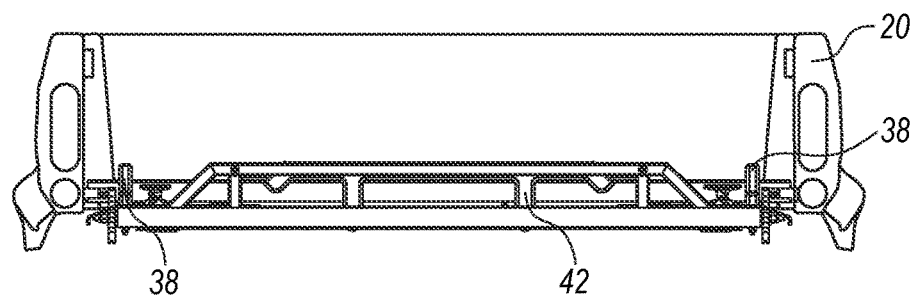
FIG. 35 is an end view of the tailgate in position 8.
Figure 36:
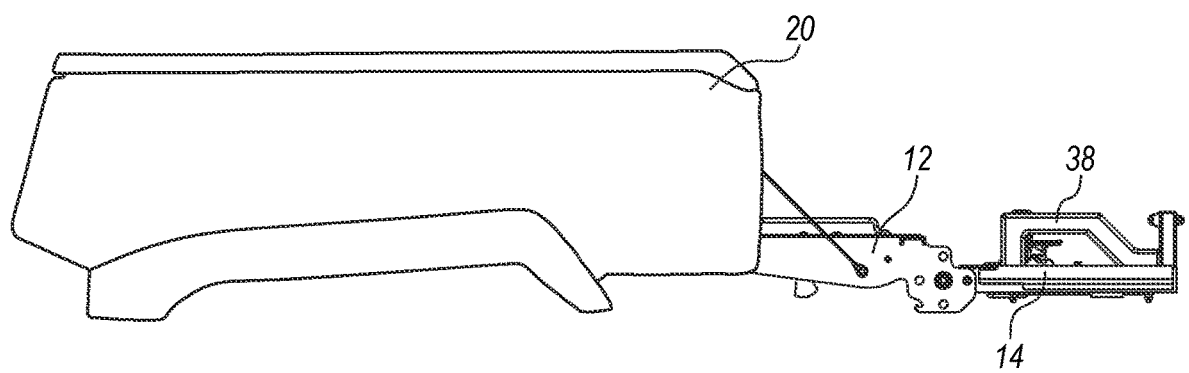
FIG. 36 is a side view of the tailgate in position 8.
Figure 44:
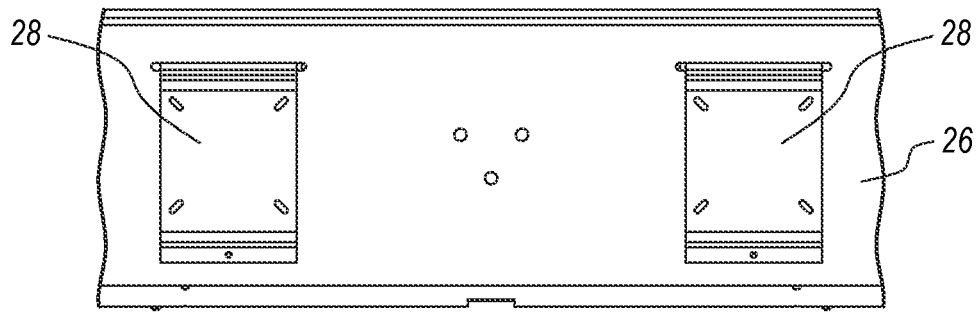
FIG. 44 is a partial perspective view of the main gate of the tailgate.
Figure 45:
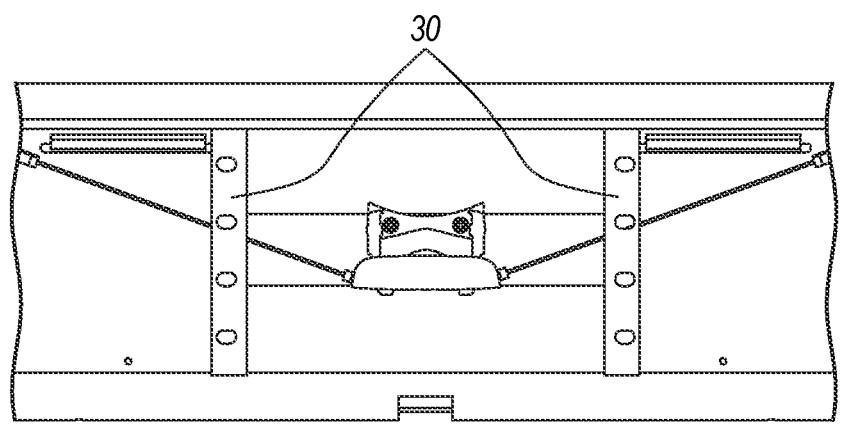
FIG. 45 is a perspective view of the inner supports of the main gate of the tailgate.
Figure 47:
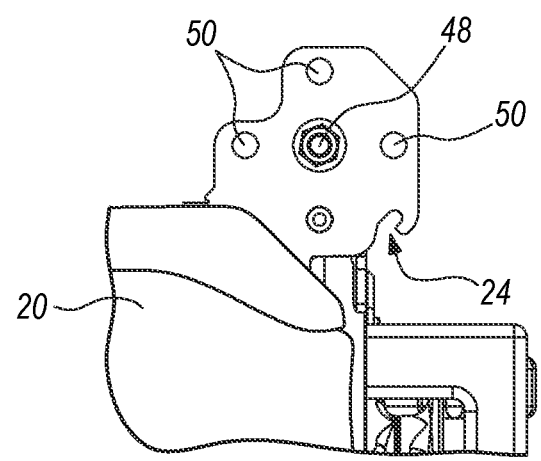
FIG. 47 is a side view of the bottle opener of the side plate of the main gate of the tailgate.

The main gate has two side plates 22 on opposite sides of the main gate 12. The side plates include a bottle opener 24 (as shown in FIG. 47) that is accessible in all deployable positions of the main gate 12. The side plates 22 also include pivots 48 to allow the intermediate gate 14 to be pivotable mounted to the main gate. The side plates 22 also include lock out holes 50 for securing the intermediate gate 14 into the different positions described below. The main gate 12 includes inner supports 30 positioned between the sides of the main gate that provide multiple tie-off points for securing equipment and gear as needed. As shown in FIGS. 7-8 and 45, a hook or rope may be threaded through the corners of the inner supports 30. The handle 72 is positioned between the inner supports 30. Mounts 28 are attached to the inner panel 26 of the main gate 12, as shown in FIG. 44. Boat seats 54 or work devices 52 (e.g., a vice) may be secured to the mounts 28, as shown in FIGS. 31-33.

Figure 5:
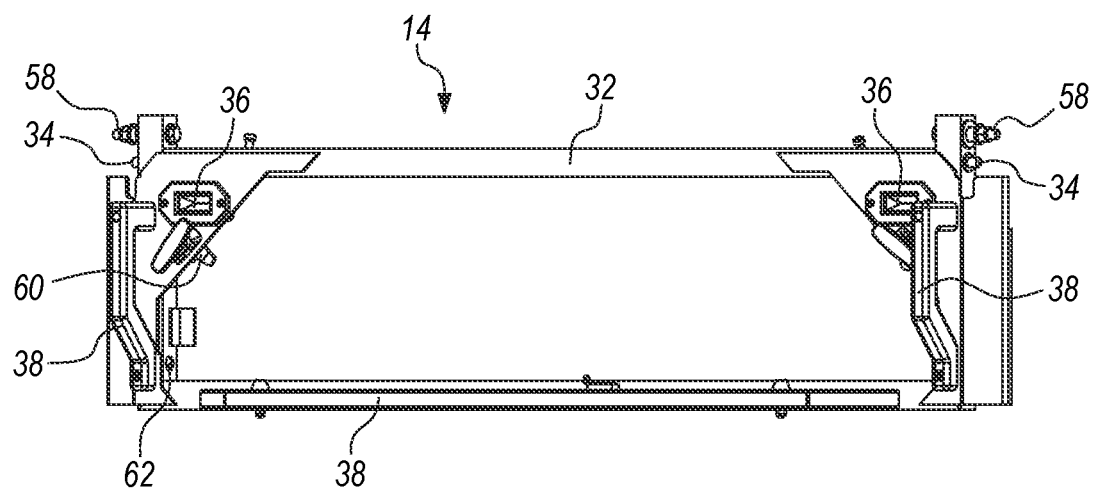
FIG. 5 is a perspective view of the intermediate gate of the tailgate.
Figure 51:
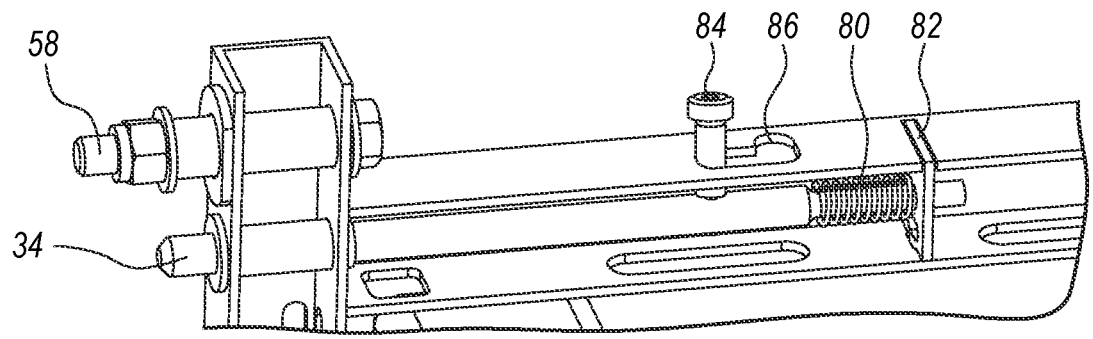
FIG. 51 is a cross-sectional view of the latch pin of the intermediate gate of the tailgate.

The intermediate gate 14 is pivotably mounted to the side plate 22 of the main gate 12. More specifically, the rods 58 in the upper portion of the intermediate gate 14 are received in the pivots 48 in the side plates of the main gate 12. The intermediate gate 14 has a roughly rectangular shaped frame 32 that is open in the middle, as shown in FIG. 5. The intermediate gate 14 has a range of motion of 0-270 degrees relative the main gate 12. The intermediate gate 14 includes latch pins 34 positioned below the rods 58 in opposite ends of the frame 32. The latch pins 34 engage the lockout holes 50 in the side plates 22 of the main gate 12 and allow the intermediate gate 14 to be locked in 90-degree positions about its 270-degree range of motion. The latch pins 34 include a spring 80 and a stop plate 82 to maintain a constant spring force in the outward direction that force one end of each of the latch pins 34 to engage the lockout holes 50, as shown in FIG. 51 with respect to the left latch pin. The latch pins 34 must be pulled inward and held in that position by the user for the latch pins 34 to be disengaged from the lockout holes 50. The latch pin 34 is pulled inward by sliding the handle 84 of the latch pin away from the lockout holes 50. Alternatively, the latch pins 34 may be pulled inward by the user and locked in that position (also referred to as the locked open position) by sliding the handle away from the lockout holes 50 and into a lock notch 86. In this event, the user does not have to manually hold the latch pins 34 in that position. To move the intermediate gate 14 relative to the main gate 12 from one position to the next position, the user must disengage the latch pins 34 from the lockout holes 50 in the side plates 22 of the main gate 12. The intermediate gate 14 is then rotated or pivoted to the desired position and the latch pins 34 are released to engage different lockout holes 50 than were previously engaged.

Figure 48:
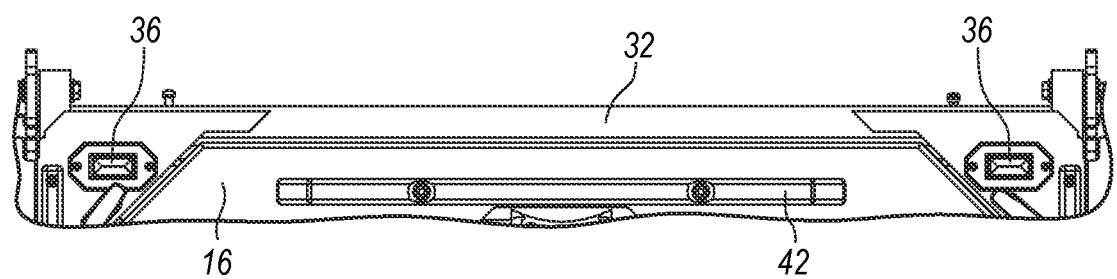
FIG. 48 is a partial end view of the tailgate.

The outer surface of the intermediate gate 14 contains sockets 36 for LED lights for added visibility during low light or no light conditions, as shown in FIG. 48. Vertically-oriented handles 38 are attached to opposite sides of the intermediate gate 14, which may be used to orient the intermediate gate 14 at the desired position. The intermediate gate 14 also includes a horizontally-oriented handle 38. The intermediate gate 14 contains secondary latches 60 which secure the drop gate 16 in a stored position (or up position) while it is not in use. The intermediate gate 14 also includes pivots 62 in which the drop gate 16 is mounted and moves.

The drop gate 16 is pivotably mounted to the intermediate gate 14. Rods 64 positioned on opposite ends of the drop gate 16 are mounted in the pivots 62 in the frame 32 of the intermediate gate 14. The drop gate 16 has a range of motion 0-90 degrees relative to the intermediate gate 14. The drop gate 16 is locked in the stored (or closed) position by latches 60 provided in the intermediate gate 14 engaging with slots 78 in the side surfaces of the drop gate 16. The latches 60 are preferably twisting cam latches. The twisting cam latches preferably include a handle at one end and a cam at the opposite end. The cams of the latches 60 may be locked in the slots 78 by rotating the handle to the locked position. To unlatch and open the drop gate 16, the user rotates the handle of the latches 60 to the unlocked position. In this position, the cams may be disengaged from the slots 78 in the drop gate 16 and the drop gate 16 may be opened or lowered.

Figure 6:
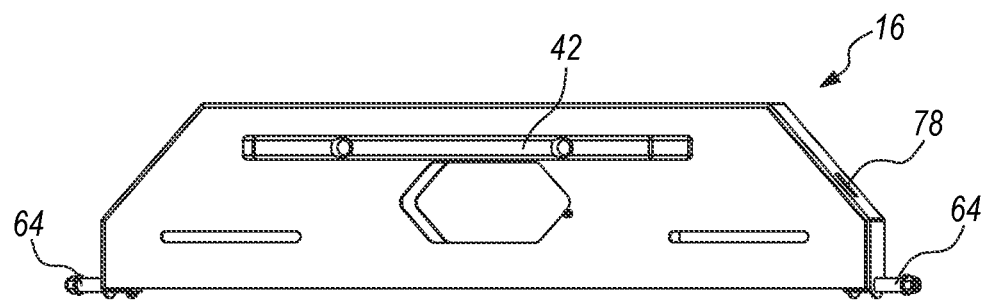
FIG. 6 is a perspective view of the drop gate of the tailgate.
Figure 46:
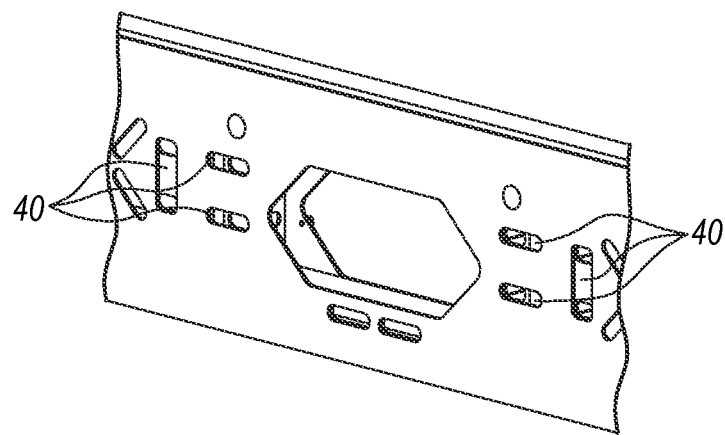
FIG. 46 is a partial perspective view of the drop gate of the tailgate.

When the drop gate 16 is in the stored position, it has an outer surface flush with the outer surface of the intermediate gate 14. As shown in FIG. 46, the drop gate has multiple openings 40 in the frame of the drop gate 16 to allow ice-chests, coolers, toolboxes, work equipment and recreational gear to be properly secured as needed. The outer surface of the drop gate 16 includes drain holes which allow liquid or sludge to drain from the interior of the drop gate, as shown in FIG. 6. An elongated handle 42 is attached to the outer surface of the drop gate 16.

Figure 1:
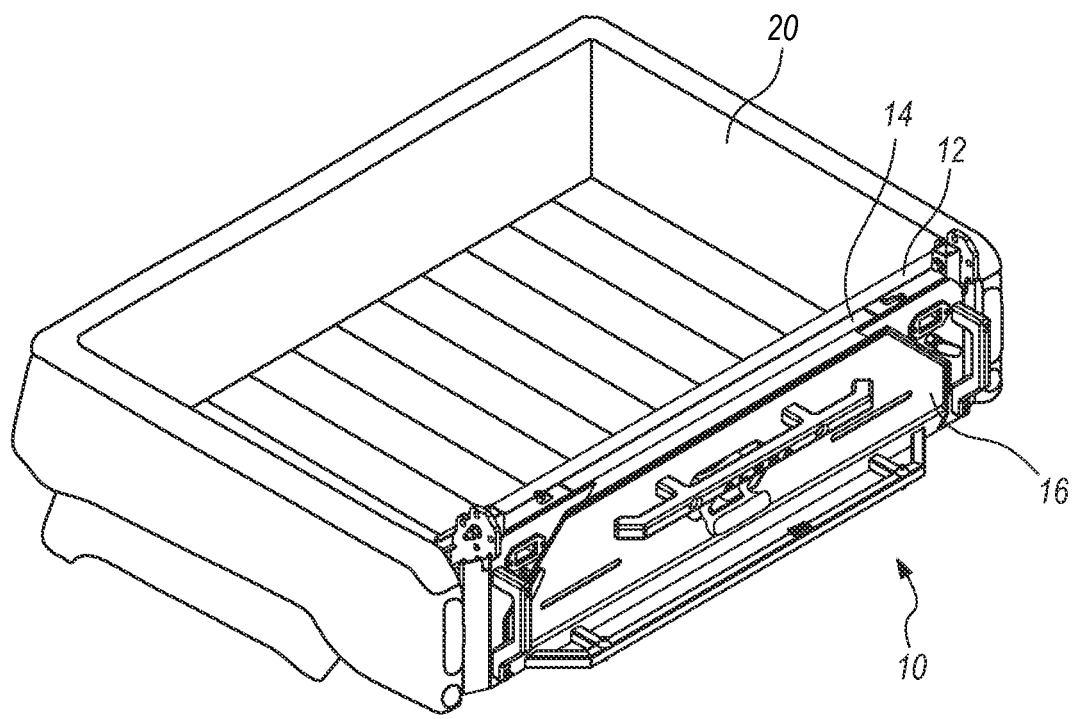
FIG. 1 is a perspective view of the tailgate in position 1.
Figure 2:
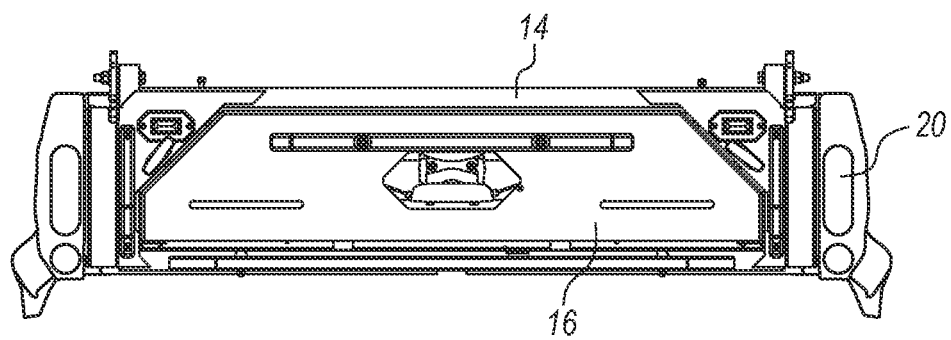
FIG. 2 is an end view of the tailgate in position 1.
Figure 3:
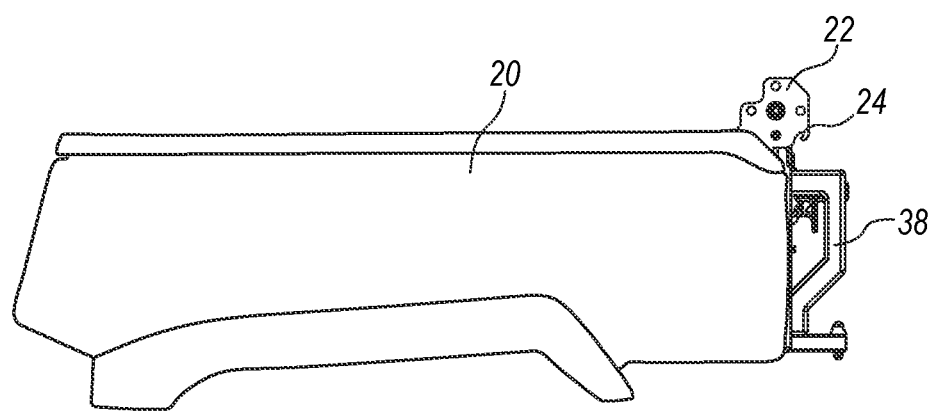
FIG. 3 is a side view of the tailgate in position 1.

The tailgate 10 of the present invention include nine different positions, as shown in FIGS. 1-3 and 7-42. In position 1, as shown in FIGS. 1-3, the main gate 12 is closed and latched to the bed 20 of the UTV in the upright position. The intermediate gate 14 and the drop gate 16 are also closed and locked. The tailgate 10 may be converted from position 1 to position 6 (described below) by unlatching and opening the main gate 12.

Figure 10:
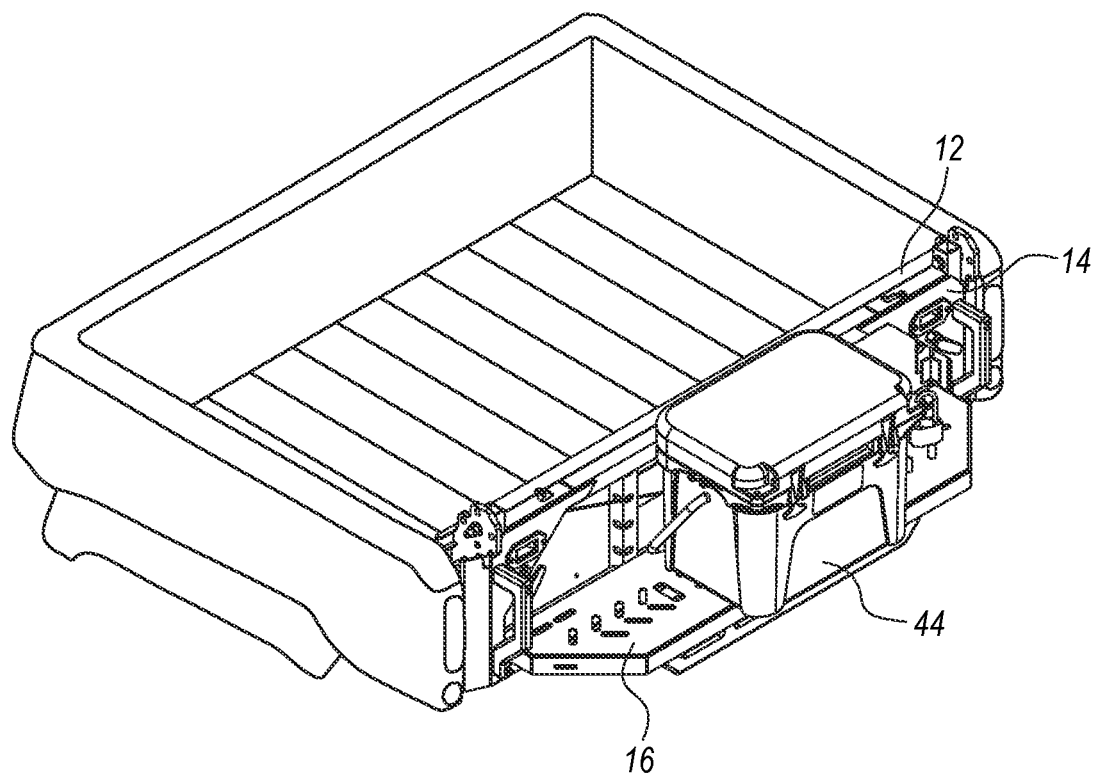
FIG. 10 is a perspective view of the tailgate in position 2 with a cooler resting on the drop gate.
Figure 11:
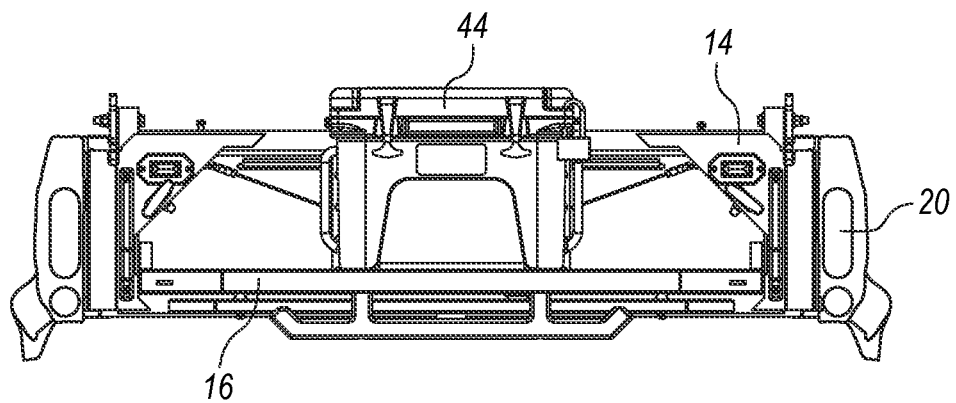
FIG. 11 is an end view of the tailgate in position 2 with a cooler resting on the drop gate.
Figure 12:
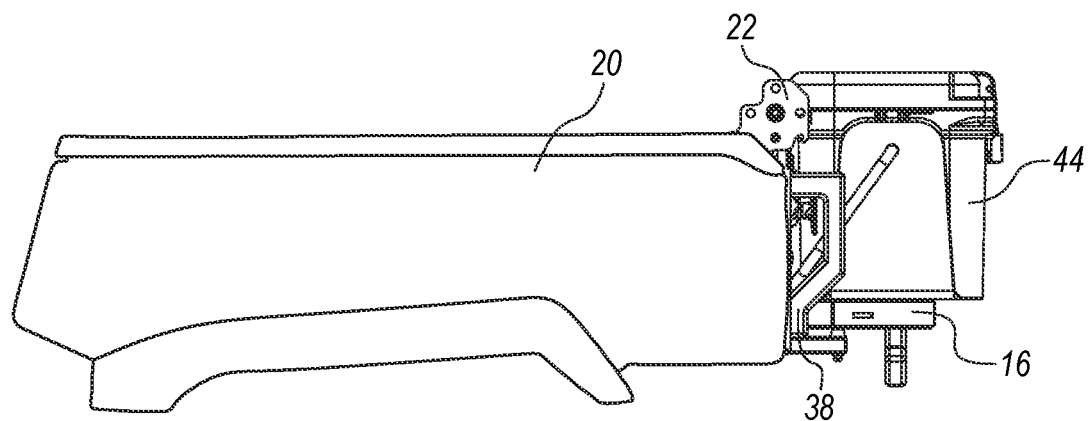
FIG. 12 is a side view of the tailgate in position 2 with a cooler resting on the drop gate.

In position 2, as shown in FIGS. 7-12, the main gate 12 is closed and latched to bed 20 of the UTV in the upright position. The intermediate gate 14 is closed and latched parallel to the main gate 12. The drop gate 16 is opened downward and extends perpendicular to the intermediate gate 14 and the main gate 12. This position allows objects, such as coolers, toolboxes, gear and equipment, to be mounted and carried outside of the bed area while still allowing the main gate 12 to function to access the interior of the bed 20 as needed by the user. FIGS. 10-12 show a cooler 44 resting on the drop gate 16.

Figure 13:
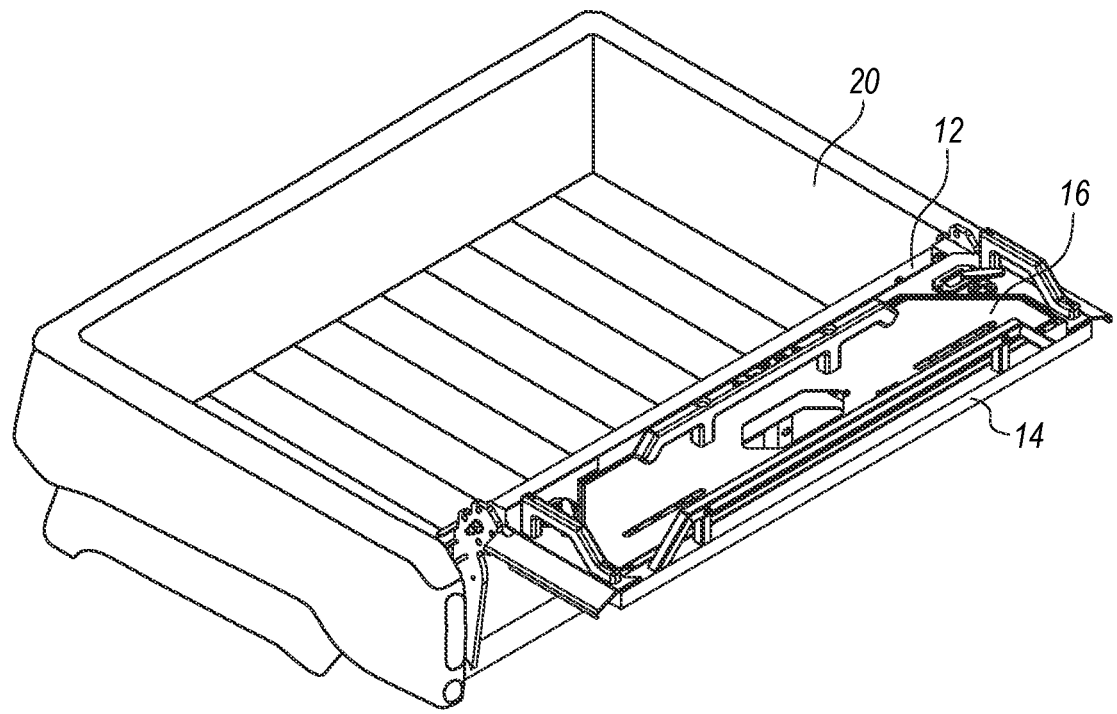
FIG. 13 is a perspective view of the tailgate in position 3.
Figure 14:
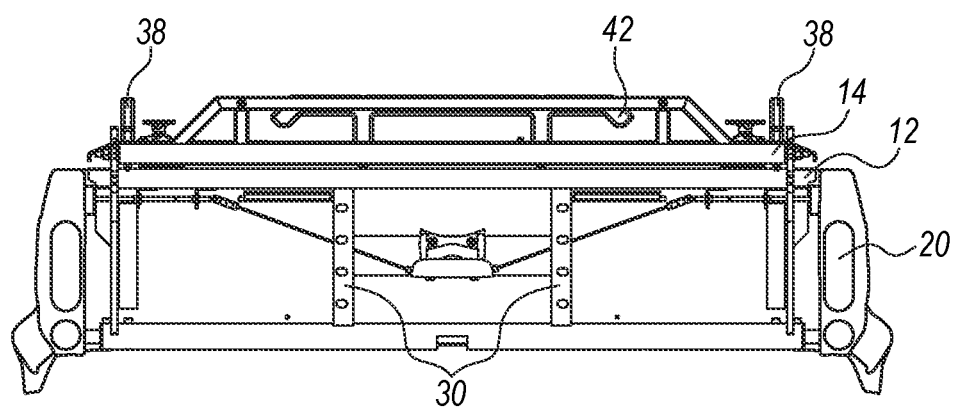
FIG. 14 is an end view of the tailgate in position 3.
Figure 15:
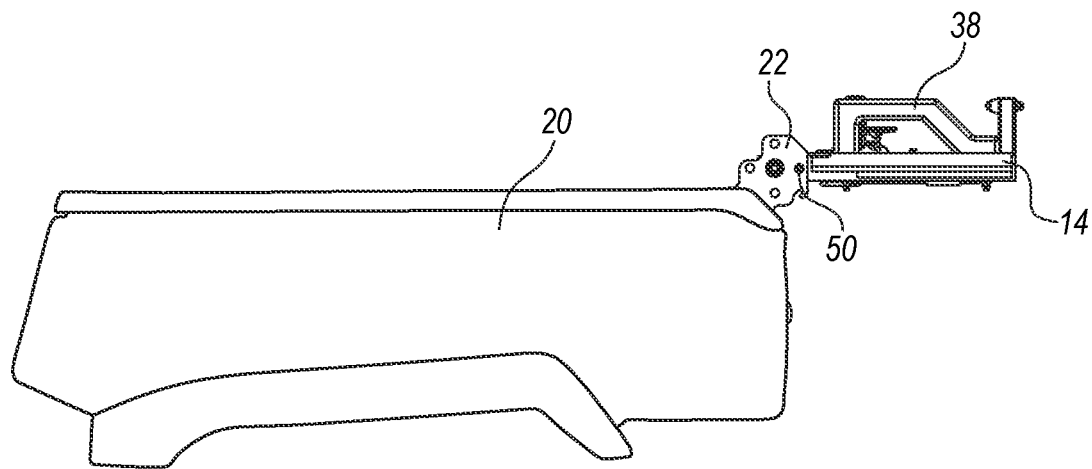
FIG. 15 is a side view of the tailgate in position 3.
Figure 16:
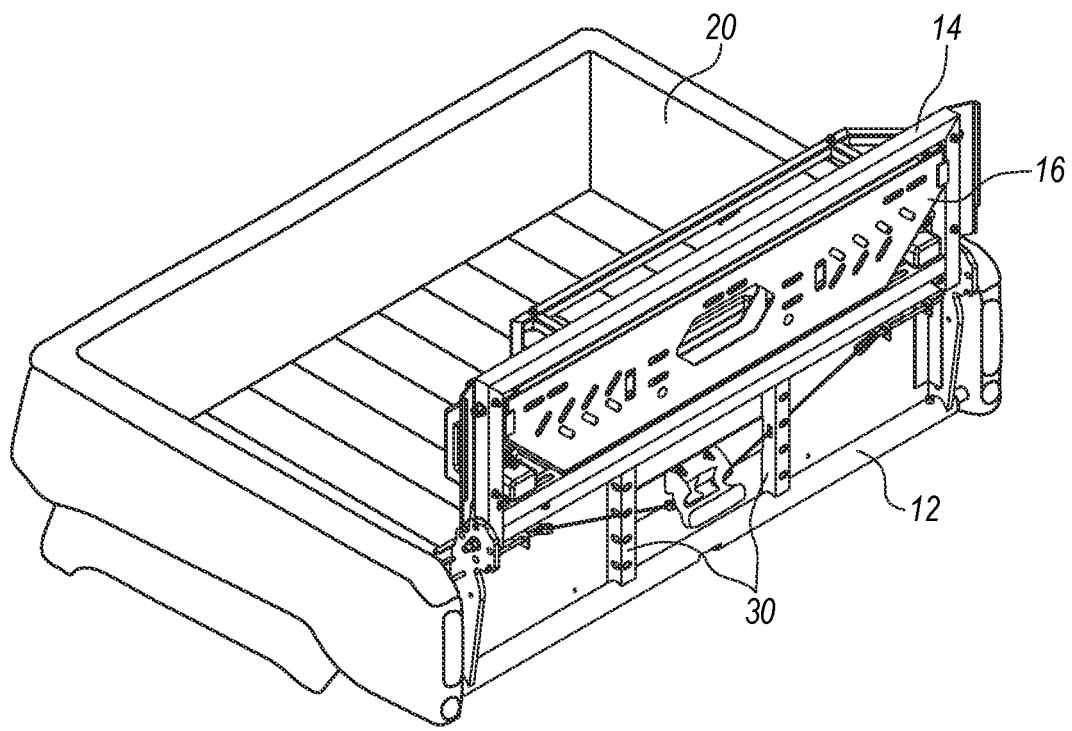
FIG. 16 is a perspective view of the tailgate in position 4.
Figure 17:
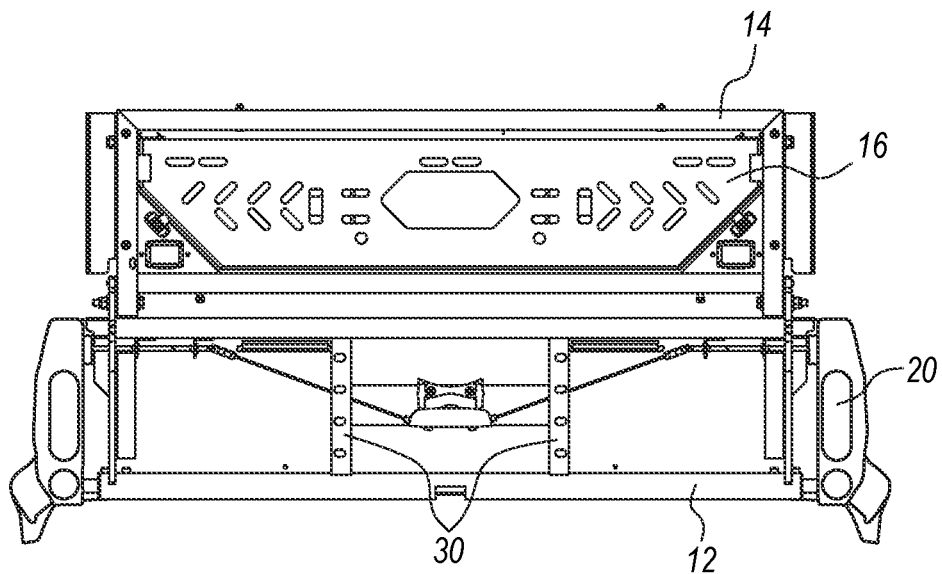
FIG. 17 is an end view of the tailgate in position 4.
Figure 18:
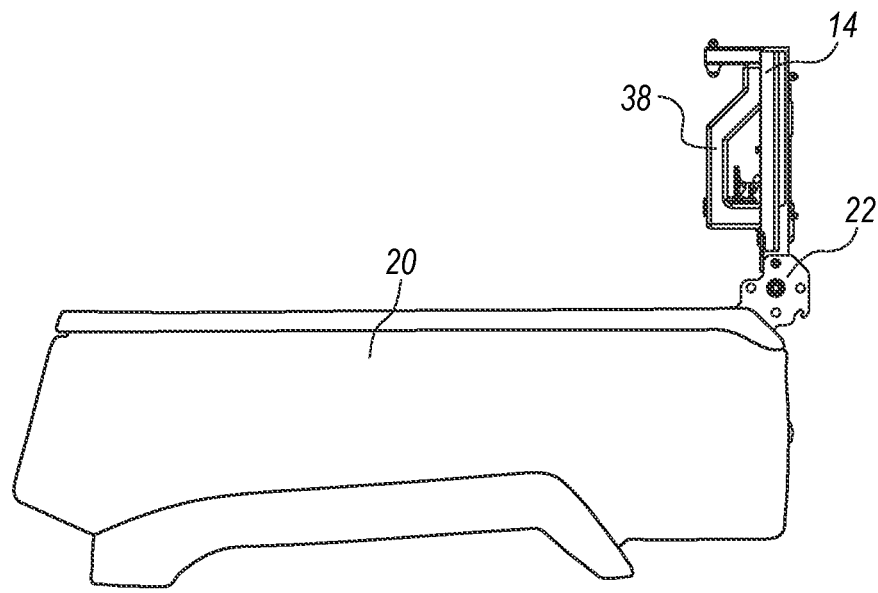
FIG. 18 is a side view of the tailgate in position 4.

In position 3, as shown in FIGS. 13-15, the main gate 12 is closed and latched to the bed 20 of the UTV in the upright position. The intermediate gate 14 is hinged 90-degrees to the main gate 12 and locked. The drop gate 16 is latched closed and its outer surface is flush with the intermediate gate 14. This position creates an elevated horizontal surface outside of the bed 20 of the UTV that can be used as a work or table surface or as a storage space. The tailgate 10 may be converted from position 3 to position 7 (described below) by opening the main gate 12.

Figure 19:
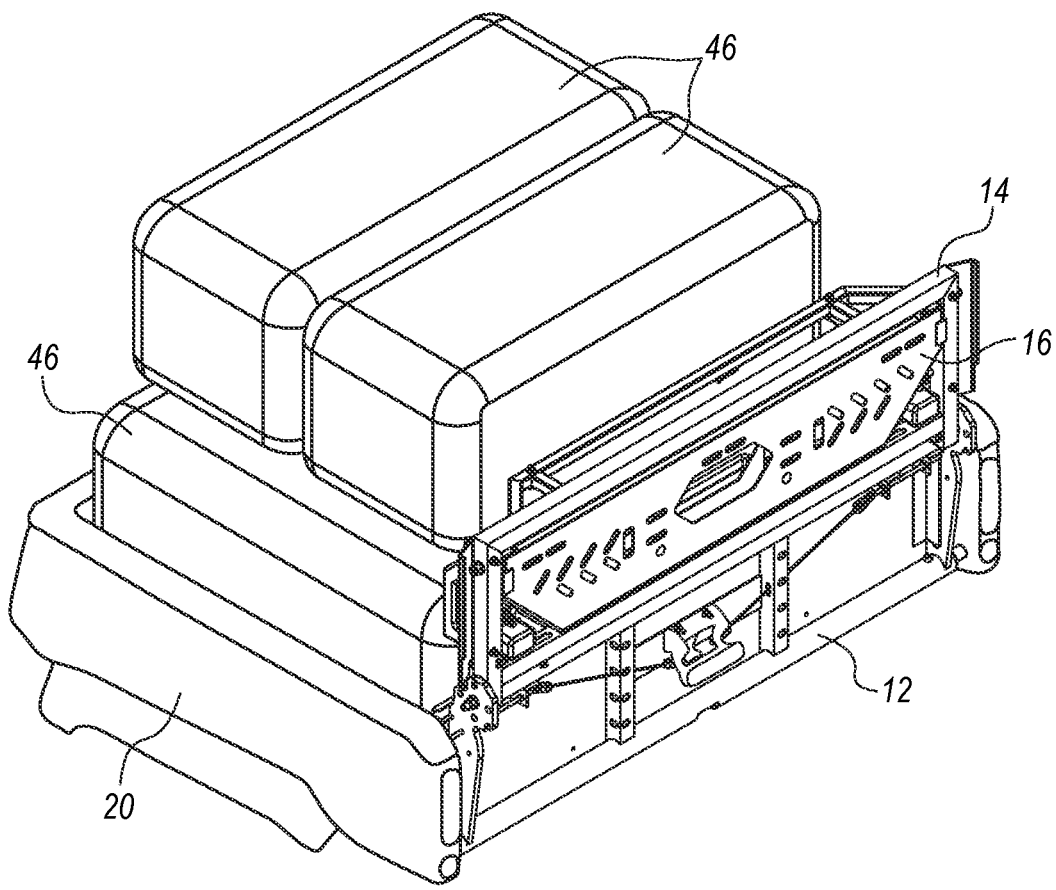
FIG. 19 is a perspective view of the tailgate in position 4 with bales of hay resting in the bed of the UTV.
Figure 20:
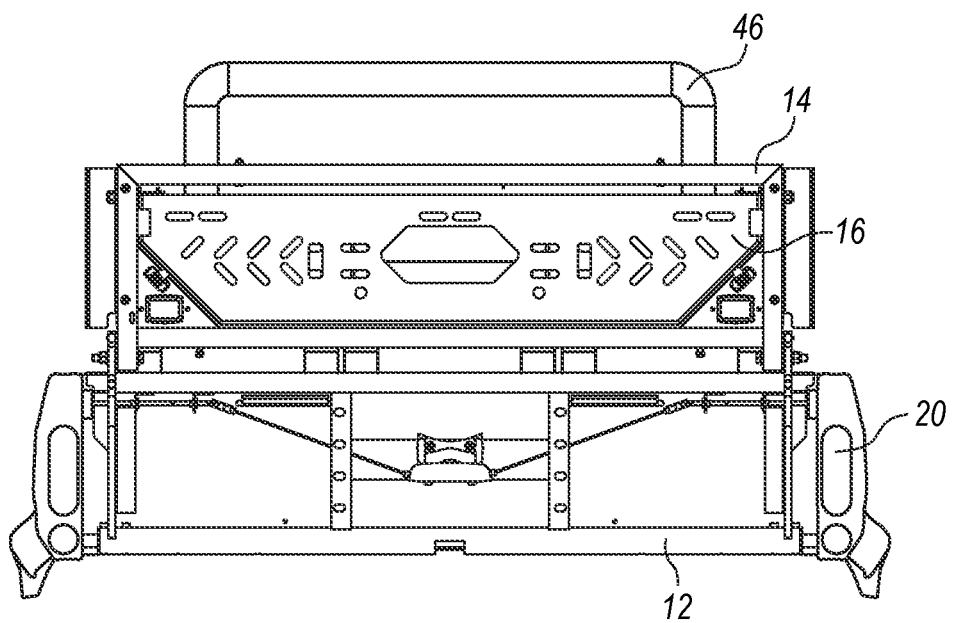
FIG. 20 is an end view of the tailgate in position 4 with bales of hay resting in the bed of the UTV.
Figure 21:
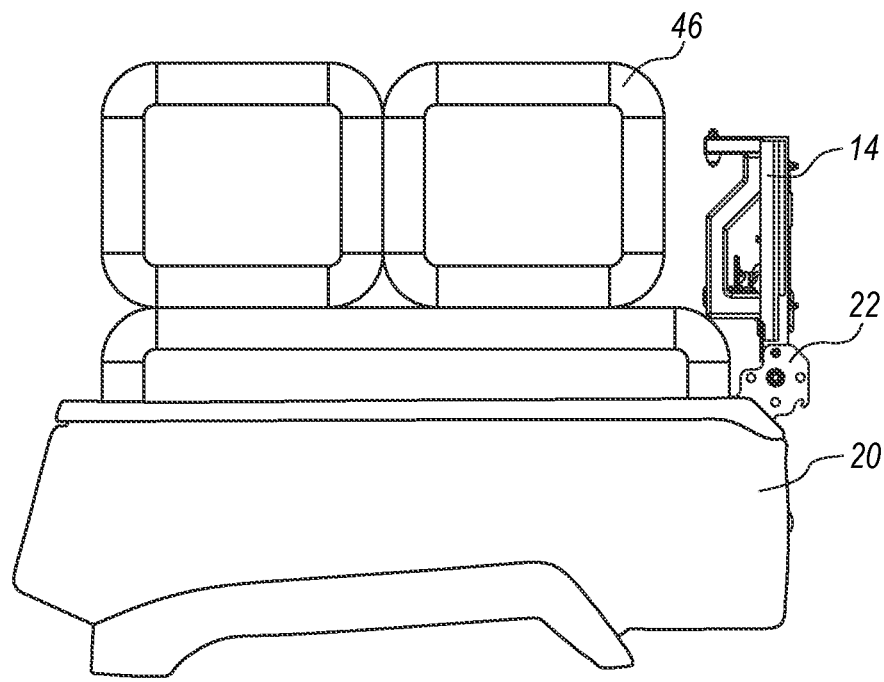
FIG. 21 is a side view of the tailgate in position 4 with bales of hay resting in the bed of the UTV.

In position 4, as shown in FIGS. 16-21, the main gate 12 is closed and latched to the bed 20 of the UTV in the upright position. The intermediate gate 14 is hinged 180-degrees relative to the main gate 12. In this regard, the intermediate gate 14 is locked and extends upward from the main gate 12. In this position, the drop gate 16 is closed. This position creates an extension to the bed 20 of the UTV that can be utilized when carrying larger objects, such as hay bales, limbs, hunting gear, or work equipment. FIGS. 19-21 show hay bales 46 being carried in the bed 20 of the UTV with the tailgate 10 in position 4. The tailgate 10 may be converted from position 4 to position 8 (described below) by opening the main gate 12.

Figure 22:
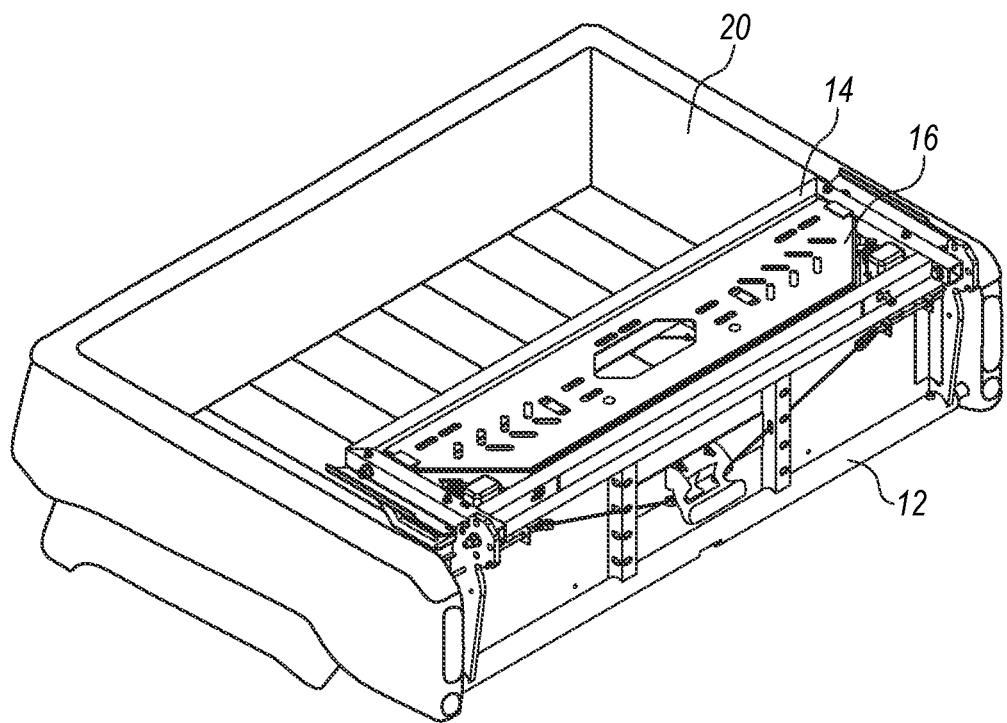
FIG. 22 is a perspective view of the tailgate in position 5.
Figure 23:
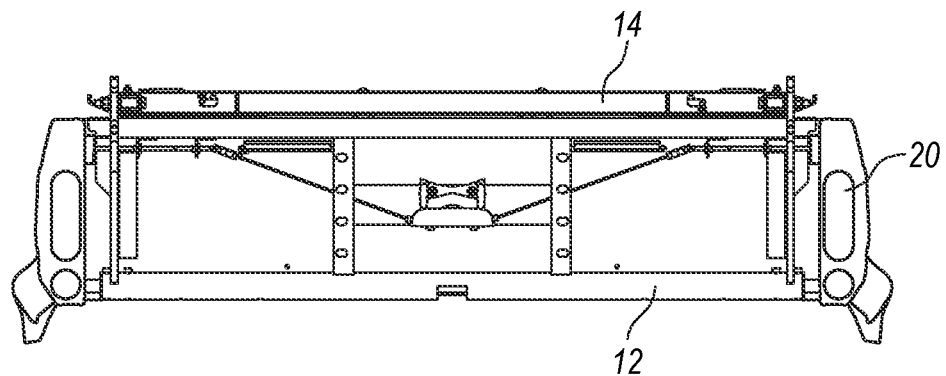
FIG. 23 is an end view of the tailgate in position 5.
Figure 24:
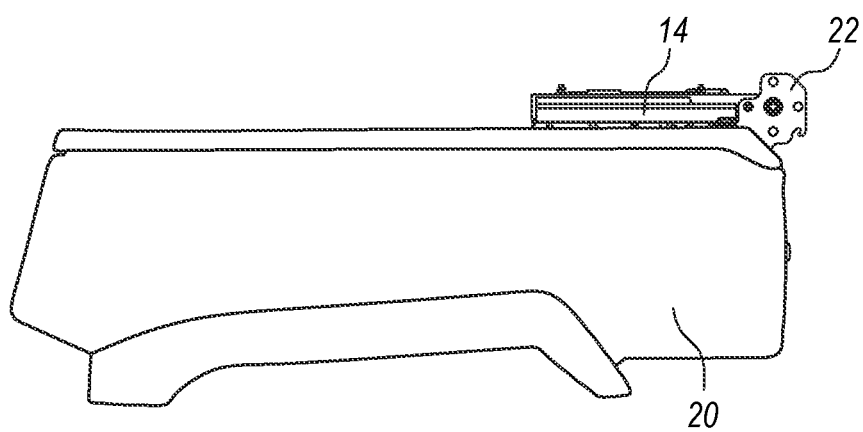
FIG. 24 is a side view of the tailgate in position 5.

In position 5, as shown in FIGS. 22-24, the main gate 12 is closed and latched to the bed 20 of the UTV in the upright position. The intermediate gate 14 is hinged 270-degrees relative to the main gate 12 and locked, and the drop gate 16 is closed. Thus, the intermediate gate 14 is positioned horizontally above a portion of the bed 20 of the UTV. This position creates an elevated horizontal surface inside the perimeter of the bed 20 of the UTV that can be used for a work or table surface or as storage space. The tailgate may be converted from position 5 to position 9 (described below) by opening the main gate 12.

Figure 25:
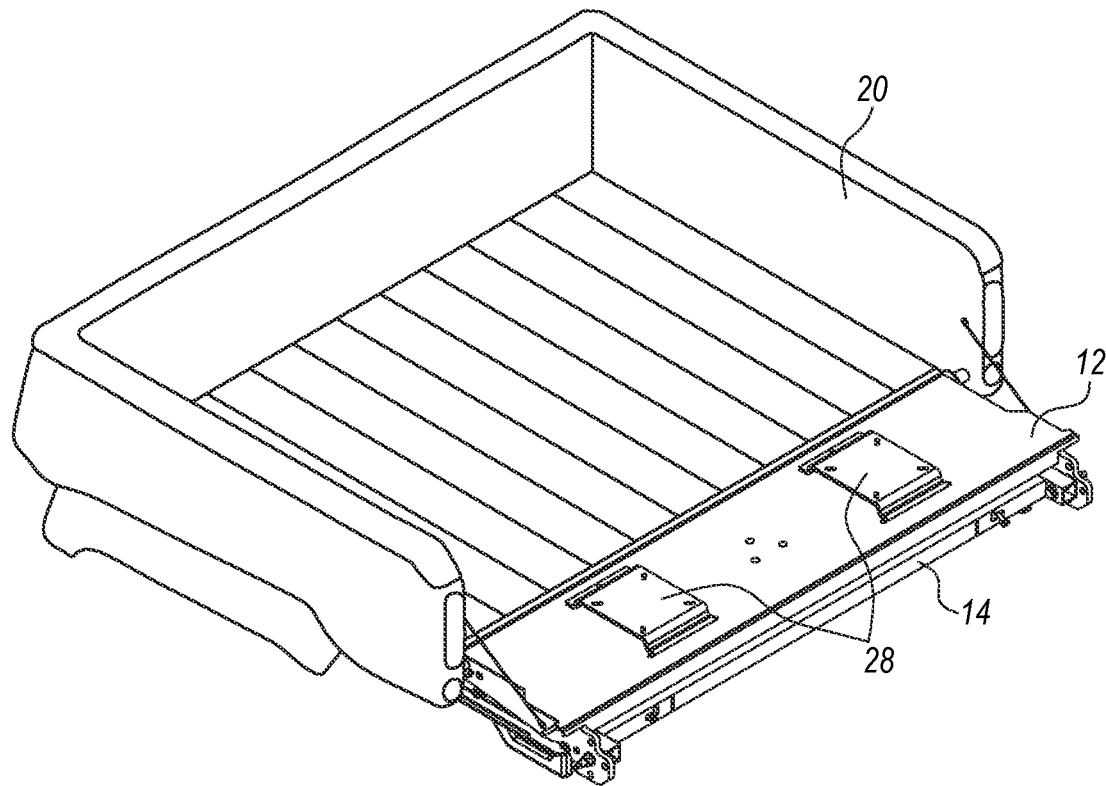
FIG. 25 is a perspective view of the tailgate in position 6.
Figure 26:
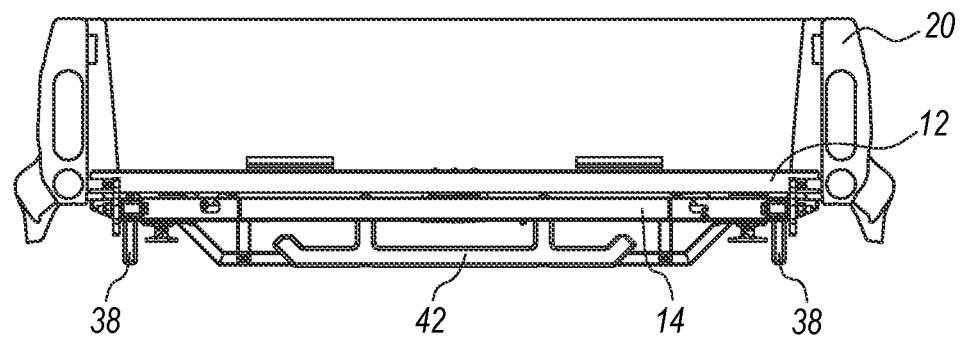
FIG. 26 is an end view of the tailgate in position 6.
Figure 27:
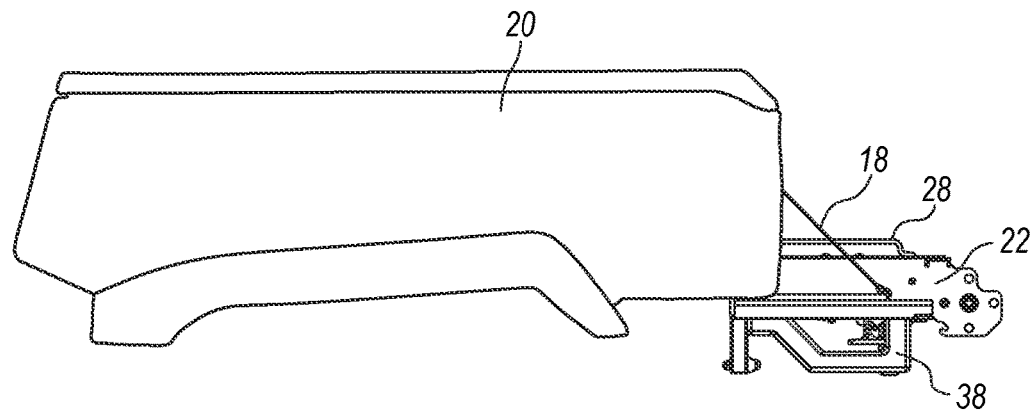
FIG. 27 is a side view of the tailgate in position 6.
Figure 28:
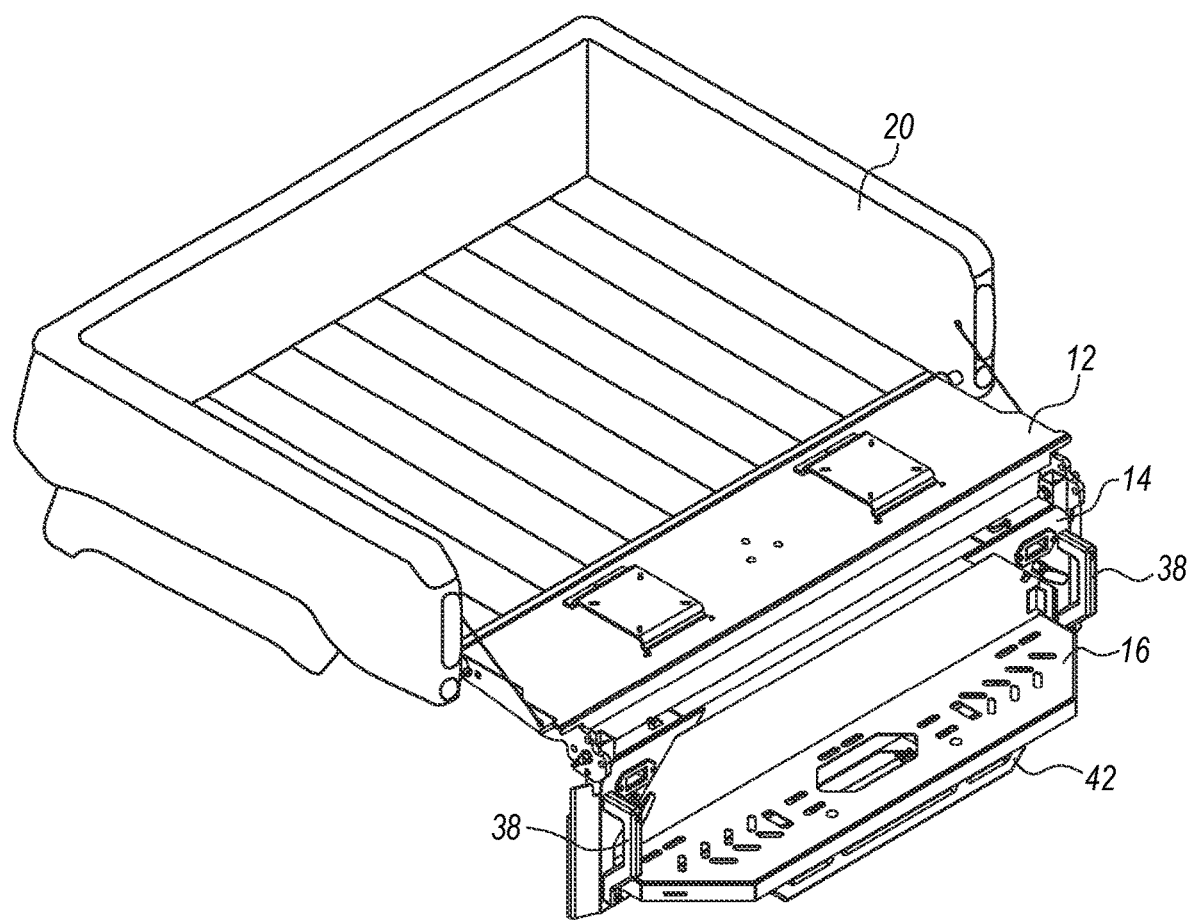
FIG. 28 is a perspective view of the tailgate in position 7.
Figure 29:
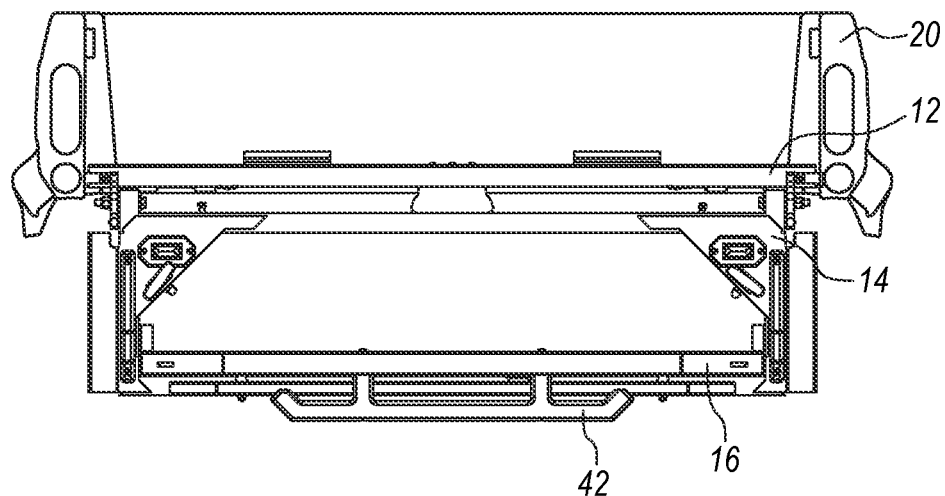
FIG. 29 is an end view of the tailgate in position 7.
Figure 30:
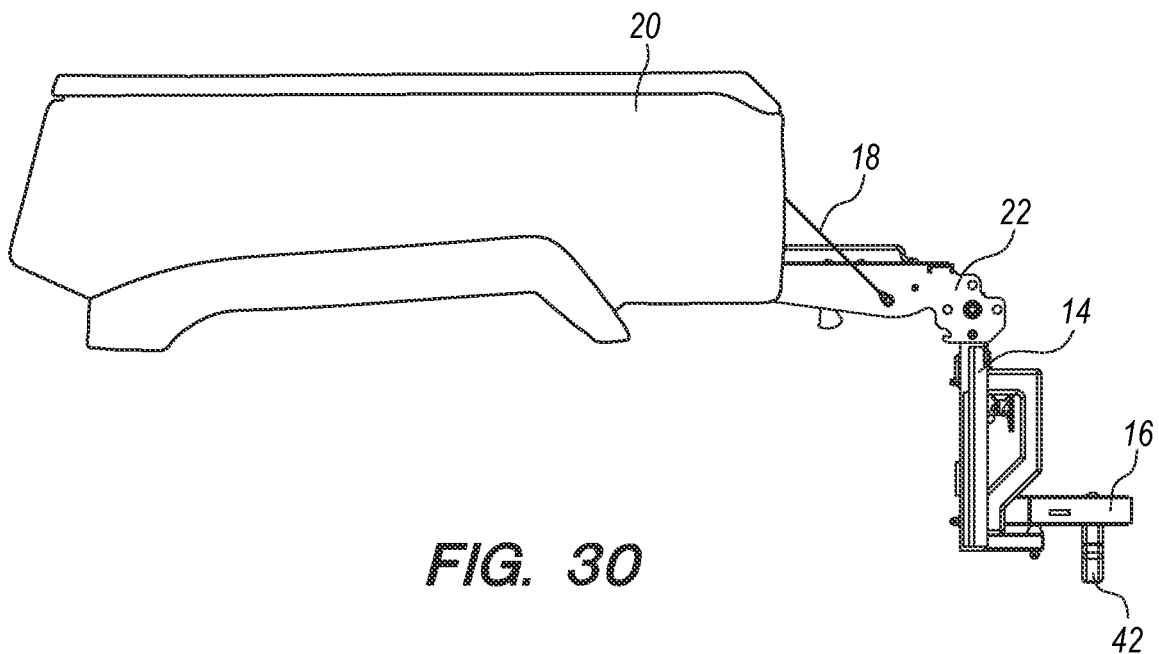
FIG. 30 is a side view of the tailgate in position 7.

In position 6, as shown in FIGS. 25-27, the main gate 12 is opened downward such that the inner surface of the main gate 12 is parallel to the bottom of the bed 20 of the UTV. The intermediate gate 14 and the drop gate 16 are closed and locked. The tailgate 10 is in this position when the main gate 12 is lowered for the user to access the interior of the bed 20 of the UTV.

In position 7, as shown in FIGS. 28-33, the main gate 12 is opened downward such that the inner surface of the main gate 12 is parallel to the bottom of the bed 20 of the UTV. The intermediate gate 14 is hinged and locked 90-degrees relative to the main gate 12. The drop gate 16 is opened downward and is positioned parallel to the main gate 12. This position allows users to access the interior of the bed 20 of the UTV, but also allows users to add or remove seats 54 or work devices 52 from the mounts 28. The drop gate 16 serves as a footrest while sitting on main gate 12 in this position. When the latch pins 34 of the intermediate gate 14 are in the unlocked position, the tailgate 10 can move between position 2 and position 7 with an object (e.g., cooler 44) secured to the drop gate 16. That is possible because intermediate gate 14 pivots freely when the latch pins 34 are disengaged and thus the intermediate gate 14 will remain perpendicular to the ground even as the main gate 12 is opened or lowered.

Figure 37:
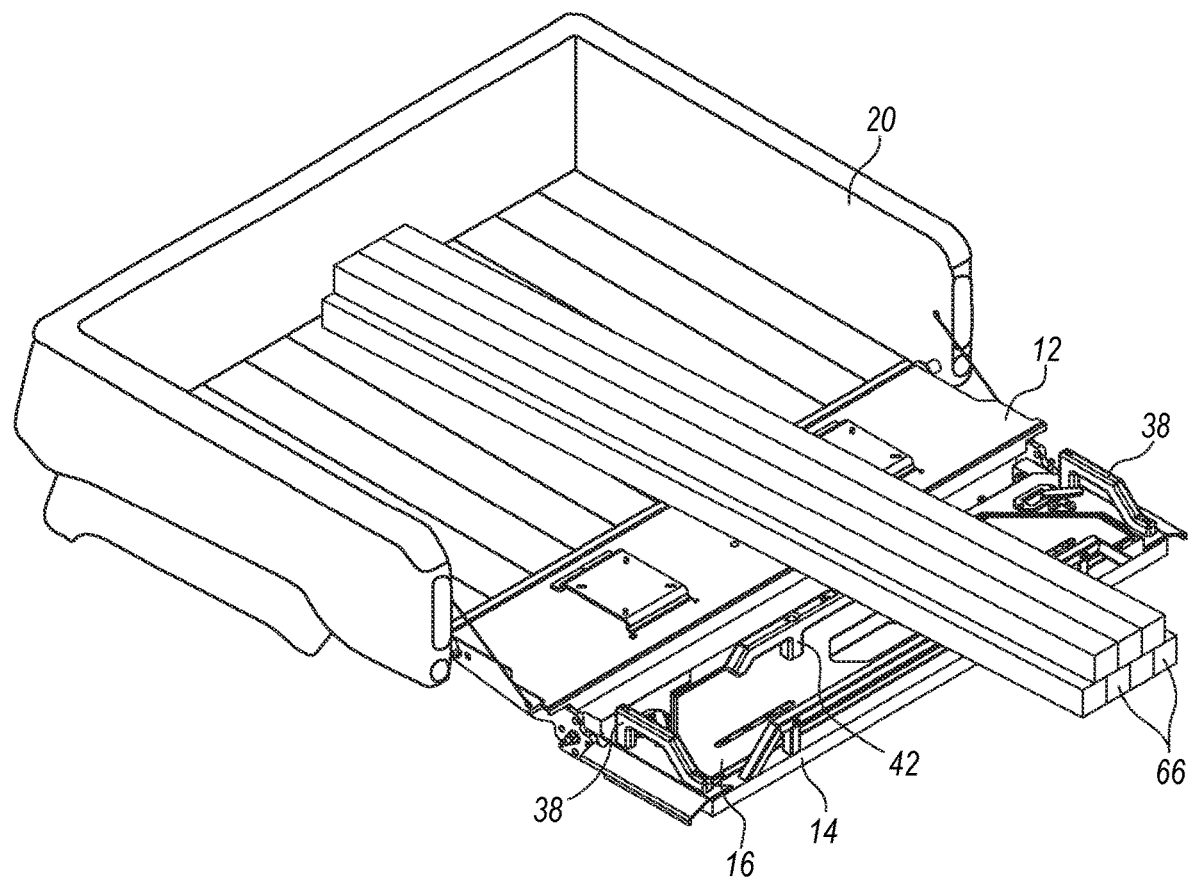
FIG. 37 is a perspective view of the tailgate in position 8 with 4×4 posts resting across the bed of the UTV, the main gate, the intermediate gate, and the drop gate.
Figure 38:
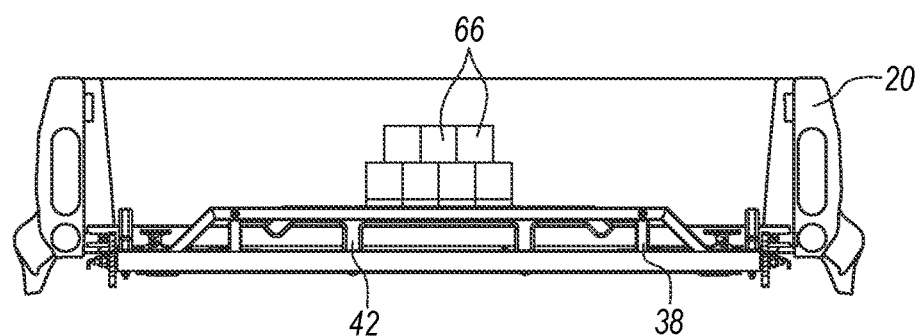
FIG. 38 is an end view of the tailgate in position 8 with 4×4 posts resting across the bed of the UTV, the main gate, the intermediate gate, and the drop gate.
Figure 39:
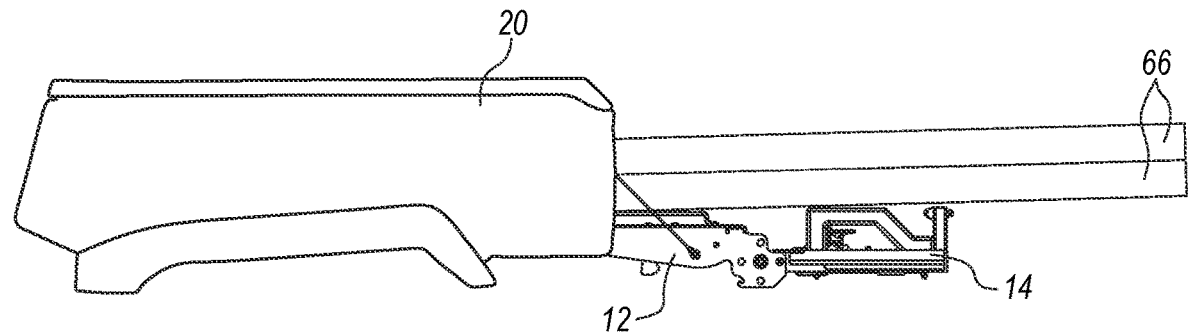
FIG. 39 is a side view of the tailgate in position 8 with 4×4 posts resting across the bed of the UTV, the main gate, the intermediate gate, and the drop gate.

In position 8, the main gate 12 is opened downward such that the inner surface of the main gate 12 is parallel to the bottom of the bed 20 of the UTV. The intermediate gate 14 is hinged and locked 180-degrees relative to the main gate 12, and the drop gate 16 is closed. This position creates a horizontal extension to the end of the bed 20 of the UTV which allows the user to carry longer items (e.g., 4×4 posts 66, limbs, hunting equipment and recreational gear) with more stability. This position also extends the standing area for accessing an overhead cargo rack that may be attached to the UTV. FIGS. 37-39 show 4×4 posts being carried in the bed 20 of the UTV with the tailgate in position 8.

Figure 40:
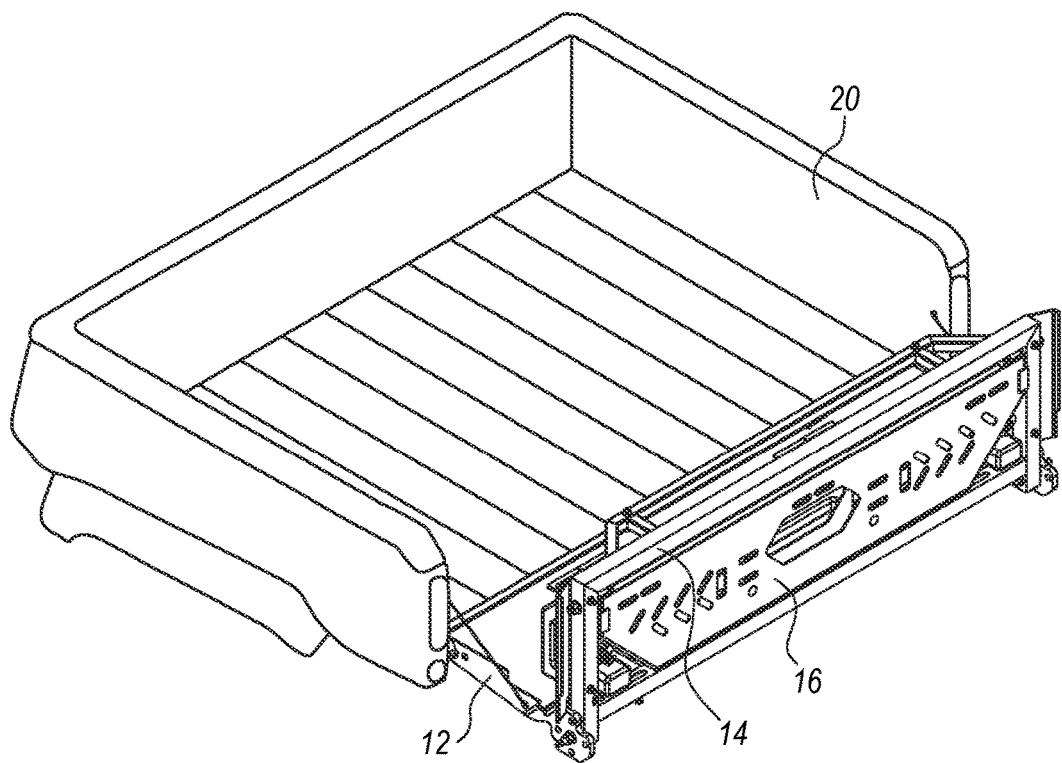
FIG. 40 is a perspective view of the tailgate in position 9.
Figure 41:
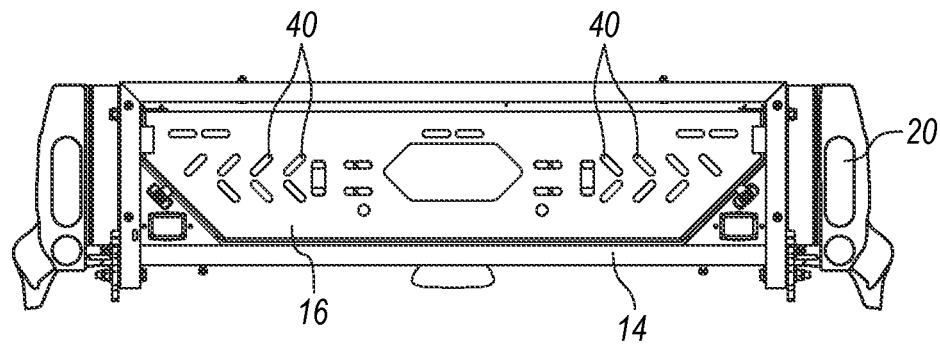
FIG. 41 is an end view of the tailgate in position 9.
Figure 42:
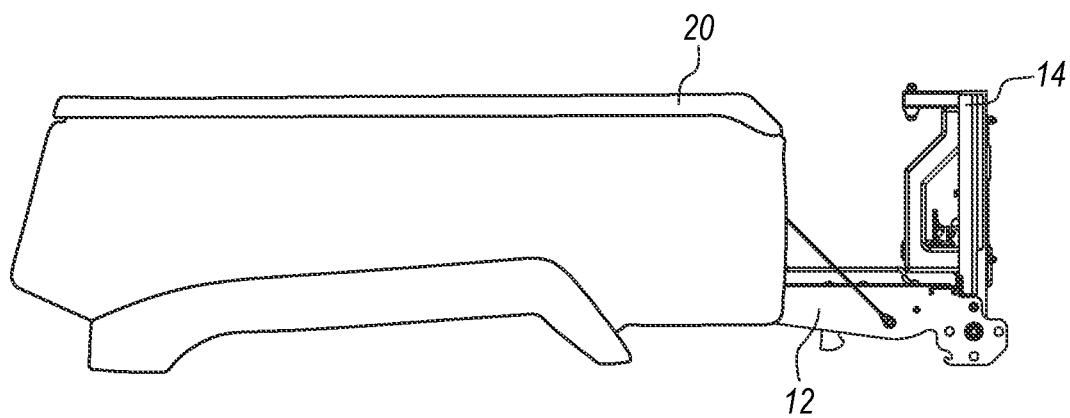
FIG. 42 is a side view of the tailgate in position 9.
Figure 43:
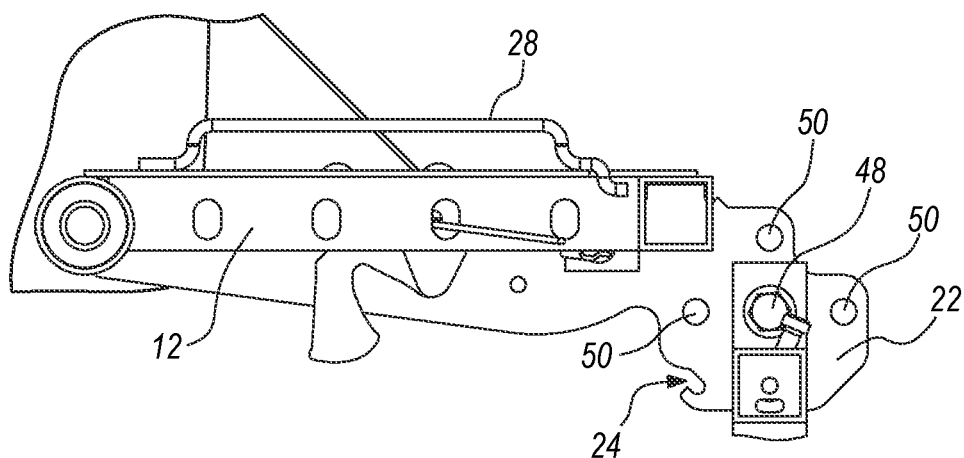
FIG. 43 is a side view of the main gate of the tailgate.

In position 9, as shown in FIGS. 40-42, the main gate 12 is opened downward such that the inner surface of the main gate 12 is parallel to the bottom of the bed 20 of the UTV. The intermediate gate 14 is hinged and locked 270-degrees relative to the main gate 12, and the drop gate 16 is closed. This position creates an extended contained bed area which allows the user to carry larger objects, such as dog kennels, hunting equipment and recreational gear, without having fasten them in place.

The present invention has been described with reference to certain preferred and alternative embodiments that are intended to be exemplary only and not limiting to the full scope of the present invention as set forth in the appended claims.

We claim:

1. A multi-gate tailgate comprising:
   a first gate pivotably mountable to an end of a vehicle bed;
   a second gate pivotally mounted to said first gate, wherein said second gate comprises a plurality of locked positions relative to said first gate; and
   a third gate pivotally mounted to said second gate, wherein said third gate comprises a first locked position relative to said second gate and a second locked position relative to said second gate, wherein said second gate and said third gate are stationarily positionable facing away from said end of said vehicle bed and stationarily positionable facing a bottom of said vehicle bed,
   wherein said first gate comprises a handle operable to unlatch said first gate, wherein said third gate comprises an opening for accessing said handle.

2. The multi-gate tailgate of claim 1, wherein said first gate comprises a first side plate and a second side plate, wherein said second gate is connected to said first side plate and said second side plate.

3. The multi-gate tailgate of claim 2, wherein said first side plate comprises a bottle opener.

4. The multi-gate tailgate of claim 2, wherein said first side plate and said second side plate comprise a plurality of spaced openings for receiving latch pins connected to said second gate.

5. The multi-gate tailgate of claim 1, wherein said first gate comprises an outer surface and an inner surface, wherein a mount is connected to said inner surface.

6. The multi-gate tailgate of claim 5, wherein a seat or a work device is connectable to said mount.

7. The multi-gate tailgate of claim 1, wherein said second gate comprises light sockets holding lights.

8. The multi-gate tailgate of claim 1, wherein a first handle and a second handle are connected to said second gate.

9. The multi-gate tailgate of claim 1, wherein said second gate comprises a frame and a hollow interior.

10. The multi-gate tailgate of claim 1, wherein said third gate comprises a handle.

11. The multi-gate tailgate of claim 1, wherein said second gate has an outer surface and said third gate has an outer surface, wherein said outer surface of said second gate is flush with said outer surface of said third gate when said third gate is in said first locked position.

12. The multi-gate tailgate of claim 1, wherein said first gate comprises a first inner support and a second inner support.

13. The multi-gate tailgate of claim 1, wherein said plurality of locked positions of said second gate comprises a first locked position, a second locked position, a third locked position, and a fourth locked position, wherein said second gate is mounted at a 90 degree angle to said first gate in said second locked position, wherein said second gate is mounted at a 180 degree angle to said first gate in said third locked position, wherein said second gate is mounted at a 270 degree angle to said first gate in said fourth locked position.

14. The multi-gate tailgate of claim 1, wherein said third gate is mounted at a 90 degree angle to said second gate in said second locked position.

15. A multi-gate tailgate comprising:
a first gate pivotably mountable to an end of a vehicle bed, wherein said first gate comprises a first side plate and a second side plate, wherein each of said first side plate and said second side plate comprises a plurality of spaced openings;
a second gate pivotably mounted to said first side plate and said second side plate of said first gate, wherein said second gate comprises latch pins received in at least some of said plurality of spaced openings in said first side plate and in said second side plate, wherein said second gate comprises a plurality of locked positions relative to said first gate, wherein said second gate is repositionable between said plurality of locked positions by moving said latch pins between said plurality of spaced openings in said first side plate and said second side plate while said second gate remains pivotably mounted to said first gate; and
a third gate pivotably mounted to said second gate, wherein said third gate comprises a first locked position relative to said second gate and a second locked position relative to said second gate.

16. A multi-gate tailgate comprising:
a first gate pivotably mountable to an end of a vehicle bed;
a second gate pivotably mounted to said first gate, wherein said second gate comprises a plurality of locked positions relative to said first gate; and
a third gate pivotably mounted to said second gate, wherein said third gate comprises a first locked position relative to said second gate and a second locked position relative to said second gate, wherein said second gate and said third gate are stationarily positionable facing away from said end of said vehicle bed and stationarily positionable facing a bottom of said vehicle bed,
wherein said plurality of locked positions of said second gate comprises a first locked position, a second locked position, a third locked position, and a fourth locked position, wherein said second gate is mounted at a 90 degree angle to said first gate in said second locked position, wherein said second gate is mounted at a 180 degree angle to said first gate in said third locked position, wherein said second gate is mounted at a 270 degree angle to said first gate in said fourth locked position.

17. The multi-gate tailgate of claim 16, wherein said first gate comprises a handle to unlatch said first gate, wherein said third gate comprises an opening for accessing said handle.

18. The multi-gate tailgate of claim 16, wherein said first gate comprises a first side plate and a second side plate, wherein said second gate is connected to said first side plate and said second side plate, wherein said first side plate and said second side plate comprise a plurality of spaced openings for receiving latch pins connected to said second gate.

19. The multi-gate tailgate of claim 16, wherein said third gate is mounted at a 90 degree angle to said second gate in said second locked position.

* * * * *